(12) United States Patent
Endo et al.

(10) Patent No.: US 12,381,201 B2
(45) Date of Patent: Aug. 5, 2025

(54) POSITIVE ACTIVE MATERIAL FOR NONAQUEOUS ELECTROLYTE SECONDARY BATTERY, POSITIVE ELECTRODE FOR NONAQUEOUS ELECTROLYTE SECONDARY BATTERY, NONAQUEOUS ELECTROLYTE SECONDARY BATTERY, METHOD FOR MANUFACTURING NONAQUEOUS ELECTROLYTE SECONDARY BATTERY, AND METHOD OF USING NONAQUEOUS ELECTROLYTE SECONDARY BATTERY

(71) Applicant: GS Yuasa International Ltd., Kyoto (JP)

(72) Inventors: Daisuke Endo, Kyoto (JP); Hiromasa Muramatsu, Kyoto (JP); Ryo Harada, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 951 days.

(21) Appl. No.: 16/973,472

(22) PCT Filed: Jun. 19, 2019

(86) PCT No.: PCT/JP2019/024376
§ 371 (c)(1),
(2) Date: Dec. 9, 2020

(87) PCT Pub. No.: WO2019/244956
PCT Pub. Date: Dec. 26, 2019

(65) Prior Publication Data
US 2021/0249645 A1    Aug. 12, 2021

(30) Foreign Application Priority Data

Jun. 21, 2018 (JP) .................................. 2018-117725
Dec. 14, 2018 (WO) .................. PCT/JP2018/046042

(51) Int. Cl.
H01M 4/131 (2010.01)
H01M 4/505 (2010.01)
(Continued)

(52) U.S. Cl.
CPC ........... *H01M 4/131* (2013.01); *H01M 4/505* (2013.01); *H01M 4/525* (2013.01);
(Continued)

(58) Field of Classification Search
CPC ...... H01M 4/131; H01M 4/525; H01M 4/505; H01M 10/0525; H01M 10/058; H01M 10/44; H01M 2004/028
See application file for complete search history.

(56) References Cited

U.S. PATENT DOCUMENTS 7,393,476 B2   7/2008  Shiozaki et al.
8,382,860 B2   2/2013  Endo et al.
(Continued)

FOREIGN PATENT DOCUMENTS

EP   2 660 907    * 11/2013
JP   2008-13405 A    1/2008
(Continued)

OTHER PUBLICATIONS

International Search Report (ISR) dated Aug. 6, 2019 filed in PCT/JP2019/024376.

*Primary Examiner* — Laura Weiner
(74) *Attorney, Agent, or Firm* — RANKIN, HILL & CLARK LLP

(57) ABSTRACT

A positive active material for a nonaqueous electrolyte secondary battery, containing a lithium-transition metal composite oxide, in which the lithium-transition metal composite oxide has an α-NaFeO$_2$ structure, with the molar ratio Li/Me of Li to the transition metal (Me) being 1.05≤Li/Me<1.4, and contains Ni and Mn, or contains Ni, Co, and
(Continued)

Mn as the transition metal (Me), with the molar ratio Mn/Me of Mn to Me being 0.4≤Mn/Me<0.6, and the molar ratio Ni/Me of Ni to Me being 0.2≤Ni/Me≤0.6.

5 Claims, 4 Drawing Sheets

(51) Int. Cl.
  *H01M 4/525* (2010.01)
  *H01M 10/0525* (2010.01)
  *H01M 10/058* (2010.01)
  *H01M 10/44* (2006.01)
  *H01M 4/02* (2006.01)

(52) U.S. Cl.
  CPC ..... *H01M 10/0525* (2013.01); *H01M 10/058* (2013.01); *H01M 10/44* (2013.01); *H01M 2004/028* (2013.01)

(56) References Cited

U.S. PATENT DOCUMENTS

| | | |
|---|---|---|
| 8,551,659 B2 | 10/2013 | Endo et al. |
| 9,385,368 B2 | 7/2016 | Christensen et al. |
| 9,543,055 B2 | 1/2017 | Endo et al. |
| 9,825,281 B2 | 11/2017 | Endo et al. |
| 9,979,012 B2 | 5/2018 | Natsui et al. |
| 10,205,192 B2 | 2/2019 | Dubois et al. |
| 10,297,822 B2 | 5/2019 | Endo et al. |
| 10,673,070 B2 | 6/2020 | Endo et al. |
| 2004/0234857 A1 | 11/2004 | Shiozaki et al. |
| 2009/0239146 A1 | 9/2009 | Nakagawa et al. |
| 2010/0233542 A1 | 9/2010 | Endo et al. |
| 2011/0037440 A1 | 2/2011 | Endo et al. |
| 2012/0115043 A1 | 5/2012 | Yu et al. |
| 2013/0313471 A1 | 11/2013 | Endo et al. |
| 2014/0004423 A1 | 1/2014 | Endo et al. |
| 2014/0038053 A1 | 2/2014 | Endo et al. |
| 2014/0059845 A1 | 3/2014 | Endo et al. |
| 2014/0234717 A1 | 8/2014 | Christensen et al. |
| 2015/0064577 A1 | 3/2015 | Natsui et al. |
| 2015/0147644 A1 | 5/2015 | Kinoshita et al. |
| 2016/0276666 A1 | 9/2016 | Christensen et al. |
| 2016/0301073 A1 | 10/2016 | Yoshikawa et al. |
| 2017/0117544 A1 | 4/2017 | Endo et al. |
| 2017/0117586 A1 | 4/2017 | Dubois et al. |
| 2018/0048015 A1 | 2/2018 | Lee et al. |
| 2018/0145318 A1 | 5/2018 | Endo et al. |
| 2020/0381720 A1 | 12/2020 | Endo et al. |

FOREIGN PATENT DOCUMENTS

| | | | |
|---|---|---|---|
| JP | 2010-050079 | | 3/2010 |
| JP | 2011-113792 A | | 6/2011 |
| JP | 4877660 B2 | | 2/2012 |
| JP | 2012-104335 A | | 5/2012 |
| JP | 2012-151085 A | | 8/2012 |
| JP | 2014-29828 A | | 2/2014 |
| JP | 2014-529868 A | | 11/2014 |
| JP | 2015-65165 A | | 4/2015 |
| JP | 2015-128044 A | | 7/2015 |
| JP | 2017-520100 A | | 7/2017 |
| JP | 2018-107118 A | | 7/2018 |
| WO | 03/044881 A1 | | 5/2003 |
| WO | WO 2015/039490 | * | 3/2015 |
| WO | 2016/190419 A1 | | 12/2016 |
| WO | 2018/012385 A1 | | 1/2018 |
| WO | WO 2018/012385 | * | 1/2018 |

* cited by examiner

POSITIVE ACTIVE MATERIAL FOR NONAQUEOUS ELECTROLYTE SECONDARY BATTERY, POSITIVE ELECTRODE FOR NONAQUEOUS ELECTROLYTE SECONDARY BATTERY, NONAQUEOUS ELECTROLYTE SECONDARY BATTERY, METHOD FOR MANUFACTURING NONAQUEOUS ELECTROLYTE SECONDARY BATTERY, AND METHOD OF USING NONAQUEOUS ELECTROLYTE SECONDARY BATTERY

TECHNICAL FIELD

The present invention relates to a positive active material for a nonaqueous electrolyte secondary battery, a positive electrode for a nonaqueous electrolyte secondary battery, containing the positive active material, a nonaqueous electrolyte secondary battery, a method for manufacturing a nonaqueous electrolyte secondary battery with the use of the positive electrode, and a method of using the nonaqueous electrolyte secondary battery.

BACKGROUND ART

Conventionally, "LiMeO$_2$-type" active materials (Me is a transition metal) that have an α-NaFeO$_2$-type crystal structure have been studied as positive active materials for nonaqueous electrolyte secondary batteries typified by lithium secondary batteries, and lithium secondary batteries obtained with LiCoO$_2$ have been widely put into practical use. The discharge capacity of LiCoO$_2$ has been, however, about 120 to 130 mAh/g. The use of Mn, which is rich as earth resources, as the Me has been desired. However, the "LiMeO$_2$-type" active materials containing Mn as Me undergo, in the case where the molar ratio Mn/Me of Mn in Me exceeds 0.5, structural change to the spinel type with charge, thereby failing to maintain the crystal structure, and the materials thus have the problem of being much inferior in charge-discharge cycle performance.

Then, various "LiMeO$_2$-type" active materials that are 0.5 or less in molar ratio Mn/Me of Mn in Me and also excellent in charge-discharge cycle performance have been proposed and partially put into practical use. For example, a positive active material containing a lithium-transition metal composite oxide LiNi$_{1/2}$Mn$_{1/2}$O$_2$ or LiNi$_{1/3}$Co$_{1/3}$Mn$_{1/3}$O$_2$ has a discharge capacity of 150 to 180 mAh/g.

In contrast to the so-called "LiMeO$_2$-type" active materials as mentioned above, so-called "lithium-excessive" active materials are also known in which the compositional ratio Li/Me of lithium (Li) to the ratio of transition metal (Me) is larger than 1, and a lithium-transition metal composite oxide represented by the compositional formula Li$_{1+\alpha}$Me$_{1-\alpha}$O$_2$ (α>0) is contained. It is also known that the above-mentioned lithium-transition metal composite oxide is produced from a hydroxide precursor (see, for example, Patent Documents 1 to 3).

Patent Document 1 discloses, for "A lithium-transition metal composite oxide represented by a compositional formula having an α-NaFeO$_2$-type crystal structure, Li$_{1+\alpha}$Me$_{1-\alpha}$O$_2$ (Me is a transition metal containing Co, Ni, and Mn, α>0)" (Claim 1), "A method for producing a positive active material for a lithium secondary battery according to claim 1 or 2, characterized in that a precursor for synthesizing the lithium-transition metal composite oxide is a hydroxide of a transition metal containing Co, Ni, and Mn." (Claim 3).

In addition, the document mentions that "although the pH in the step of producing the precursor by coprecipitating a compound containing Co, Ni, and Mn in a solution is not to be considered limited, the pH can be adjusted to 10.514 in the case of making an attempt to prepare the coprecipitated precursor as a coprecipitated hydroxide precursor. In order to increase the tap density, the pH is preferably controlled. The pH of 11.5 or less allows the tap density to be adjusted to 1.00 g/cm$^3$ or more, and then allows the high rate discharge performance to be improved. Furthermore, the pH of 11.0 or less allows the particle growth rate to be promoted, thus making it possible to reduce the stirring duration after the completion of dropping the raw material aqueous solution." (paragraph [0032]).

Then, the document mentions that, regarding the initial charge-discharge step for the lithium secondary battery with the positive active material according to the example, "the charge is performed by constant current constant voltage charge with a current of 0.1 C A and a voltage of 4.6 V" (paragraph [0098]).

Patent Document 2 discloses "A positive active material for a nonaqueous electrolyte battery, containing a lithium-transition metal composite oxide, wherein a molar ratio (Li/Me) between Li and a transition metal (Me) constituting the lithium transition metal composite oxide is larger than 1, the transition metal (Me) contains Mn, Ni, and Co, the lithium-transition metal composite oxide has an α-NaFeO$_2$-type crystal structure, and has an X-ray diffraction pattern that can belong to a space group R3-m, a diffraction peak of a (104) plane with a mirror index hkl, obtained by X-ray diffraction measurement with a CuKα line, has a half width (FWHM (104)) of 0.21° or more and 0.55° or less, a ratio (FWHM (003)/FWHM (104)) of a half width of a diffraction peak of a (003) plane to the half width of the diffraction peak of the (104) plane is 0.72 or less, and a peak differential pore volume of particles of the lithium-transition metal composite oxide, determined by a BJH method from an adsorption isotherm obtained by using a nitrogen gas adsorption method, is 0.33 mm$^3$/(g·nm) or less." (Claim 1), and "A method for producing the positive active material for a nonaqueous electrolyte secondary battery according to any one of claims 1 to 7, wherein a hydroxide precursor of the transition metal and a lithium compound are subjected to firing at a temperature of 800° C. or higher and 940° C. and lower." (Claim 8).

Further, the document mentions, as in paragraph [0032] of Patent Document 1, that the pH in the step of producing the hydroxide precursor can be 10.5 to 14, and that in order to increase the tap density, the pH is preferably controlled (paragraph [0031]).

Then, the document mentions that the initial charge-discharge step for the lithium secondary battery prepared with the use of the positive active material according to the example was performed as "constant current constant voltage charge with a current of 0.1 C mA and a voltage of 4.6 V" (paragraph [0093]).

Patent Document 3 discloses "An active material for a lithium secondary battery, containing a solid solution of a lithium-transition metal composite oxide that has an α-NaFeO$_2$-type crystal structure, characterized in that compositional ratios of Li, Co, Ni, and Mn contained in the solid solution satisfy Li$_{1+(1/3)x}$Co$_{1-x-y}$Ni$_{(1/2)y}$Mn$_{(2/3)x+(1/2)y}$ (x+y≤1, 0≤y, 1−x−y=z), in a triangular phase diagram of a system Li[Li$_{1/3}$Mn$_{2/3}$]O$_2$(x)-LiNi$_{1/2}$Mn$_{1/2}$O$_2$(y)-LiCoO$_2$(z), (x, y, z) is represented by values in a range on a line of or inside a heptagon ABCDEFG with apexes of point A (0.45, 0.55, 0), point B (0.63, 0.37, 0), point C (0.7, 0.25, 0.05), point D (0.67, 0.18, 0.15), point E (0.75, 0, 0.25), point F (0.55, 0, 0.45), and point G (0.45, 0.2, 0.35), and an intensity ratio between diffraction peaks of a (003) plane and a (104) plane, obtained by X-ray diffraction measurement, is I(003)/I(104)≥1.56 before charge-discharge and I(003)/I(104)>1 at the end of discharge." (Claim 1), and "The active material for a lithium secondary battery according to claim 1, characterized in that an amount of electricity that can be discharged in a potential region of 4.3 V (vs. Li/Li$^+$) or lower is 180 mAh/g or more in a case where the battery undergoes a step of initially charging the battery with electricity for reaching a region with relatively flat potential change that appears with respect to an amount of charge in a positive electrode potential range of higher than 4.3 V (vs. Li/Li$^+$) and 4.8 V or lower (vs. Li/Li$^+$)." (Claim 2).

Then, the document mentions, in the example, that the crystal phase of the coprecipitated hydroxide precursor obtained by adjusting the pH to 11.5 is a "ß-Ni(OH)$_2$-type single phase" (paragraphs [0099] to [0100]).

Furthermore, the document mentions that regarding the initial charge-discharge step for the lithium secondary battery prepared with the use of the positive active material according to the example, "the charge is performed by constant current constant voltage charge with a current of 0.1 It A and a voltage of 4.5 V" (paragraph [0114]).

In addition, Patent Document 4 mentions that, "A nonaqueous electrolyte secondary battery comprising a positive electrode containing a positive active material, a negative electrode containing a negative active material, and a nonaqueous electrolyte solution containing a nonaqueous solvent, characterized in that the positive active material contains a lithium-containing transition metal oxide represented by the general formula (1) Li$_{1+x}$Mn$_y$M$_z$O$_2$ (where x, y, and z satisfy 0<x<0.4, 0<y<1, 0<z<1, and x+y+z=1, and M represents one or more metal elements containing at least Ni or Co), and the nonaqueous solvent contains a fluorinated cyclic carbonate in which two or more fluorine atoms are directly bonded to a carbonate ring." (Claim 1).

Furthermore, the document mentions that as Example 1 of the secondary battery, with "Li$_{1.2}$Mn$_{0.54}$Ni$_{0.13}$Co$_{0.13}$O$_2$" for the positive active material, the negative electrode containing silicon and carbon, and "LiPF$_6$ dissolved to a concentration of 1 mol/liter in a nonaqueous solvent of 4,5-difluoroethylene carbonate and ethyl methyl carbonate with a volume ratio of 2:8" for the nonaqueous electrolyte, initial charge-discharge was performed as follow: "The battery was charged with electricity at a constant current of 0.5 It until the battery voltage reached 4.45 V, and further subjected to constant voltage charge at a constant voltage of 4.45 V until the current value reached 0.05 It. It is to be noted that the potential of the positive electrode in this case was 4.60 V based on metallic lithium. Thereafter, the battery was discharged at a constant current of 0.5 It until the battery voltage reached 1.50 V" (paragraphs [0041] to [0049]).

Furthermore, Patent Document 5 discloses "A positive active material for a lithium secondary battery, the material being a lithium composite oxide of a lithium-nickel-manganese cobalt-based composite oxide represented by the following general formula (1):

(In the formula, x is 1.02≤x≤1.25, y is 0.30≤y≤0.40, and z is 0.30≤z≤0.40.) containing therein one, or two or more metal atoms (Me) selected from Mg, Al, Ti, Cu, and Zr at 0.1 mol % or more and less than 5 mol %, characterized in that an amount of Li$_2$CO$_3$ present on particle surfaces is 0.05 to 0.20% by weight." (Claim 1).

In addition, the document mentions that "the lithium composite oxide has a tap density of 1.5 g/ml or more. The reason therefor is that as the tap density of the lithium composite oxide is less than 1.5 g/ml, the electrode density tends to decrease, and the discharge capacity of the lithium secondary battery tends to decrease. In particular, the tap density of the lithium composite oxide within the range of 1.7 to 2.8 g/ml is preferable particularly from the viewpoint of increasing the discharge capacity of the lithium secondary battery." (paragraph [0021]).

Then, the document mentions that, in the example, composite hydroxide samples A and B with "the molar ratio Ni:Co:Mn in the composite hydroxide=0.334:0.333:0.333" were mixed with a lithium carbonate, a compound of Me, and subjected to firing at 900° C. to obtain lithium composite oxide samples with Li/(Ni+Co+Mn+Me) of 1.17 to 1.19 (paragraphs [0067] to [0073] and [0084], Table 3).

Patent Document 6 discloses "A lithium-nickel-manganese-cobalt composite oxide with a press density of 3.3 to 4.5 g/cm$^3$, wherein in a particle size distribution on a volumetric basis, particles of 10 μm or less accounts for a proportion of 10 to 70% by volume." (Claim 1), and "The lithium-nickel-manganese-cobalt composite oxide according to claims 1 and 2, having a composition represented by the following chemical formula Li$_{1+a}$Ni$_b$Mn$_c$Co$_d$M$_e$O$_2$ (where M is a metal other than Ni, Mn, Co, and Li):

$a+b+c+d+e=1$ $0<a≤0.2$ $0.2≤b/(b+c+d)≤0.4$ $0.2≤c/(b+c+d)≤0.4$ $0<d/(b+c+d)≤0.4$ $0≤e≤0.1$ and having a BET specific surface area of 0.05 to 1.0 m$^2$/g." (Claim 3).

Then, the document discloses, in the example, composite oxides that have a composition of Li$_{1.04}$[Ni$_{0.32}$Mn$_{0.32}$Co$_{0.32}$]O$_2$, and press densities of 3.56 g/cm$^3$, 3.43 g/cm$^3$, 3.52 g/cm$^3$, 3.47 g/cm$^3$, and 3.31 g/cm$^3$ in a case where the oxides are pressed at a pressure of 2 t/cm$^2$ (paragraphs [0075], [0082], [0086], [0090], and [0094]).

PRIOR ART DOCUMENTS

Patent Documents

Patent Document 1: JP-A-2014-029828
Patent Document 2: International Publication 2016/190419
Patent Document 3: Japanese Patent No. 4877660
Patent Document 4: JP-A-2012-104335
Patent Document 5: JP-A-2011-113792
Patent Document 6: JP-A-2008-013405

SUMMARY OF THE INVENTION

Problems to be Solved by the Invention

The standards (for example, "GB/T (China Recommended National Standards)" for automobile batteries) provide that the safety of nonaqueous electrolyte secondary batteries should be ensured even if the batteries are accidentally overcharged. Examples of a method for evaluating the improvement in safety include a method of, with the assumption that a charge control circuit is broken, recording an SOC at which a sudden rise in battery voltage is observed in the case where a current is forced to be further applied beyond the full charge state (SOC 100%). In the case where no sudden increase in battery voltage is observed until reaching a higher SOC, improved safety is recognized. In this regard, the SOC, which is an abbreviation for State Of Charge, represents the charge state of a battery by the ratio of the residual capacity therein to the capacity in the case of full charge, and the full charge state is expressed as "SOC 100%".

As shown in FIG. 1, with the positive electrode including the lithium-excessive active material in initial charge with electricity up to a positive electrode potential of 5.0 V (vs. Li/Li$^+$), a region where the potential change is relatively flat with respect to the amount of charge is observed within the positive electrode potential range of 4.5 V (vs. Li/Li$^+$) or higher and 5.0 V (vs. Li/Li$^+$) or lower. As for the region (capacity band) with flat potential change, in the positive electrode once subjected to the charge process until the completion of the region with flat potential change, the region with flat potential change will not be observed again even if charge is performed up to 5.0 V (vs. Li/Li$^+$). Nonaqueous electrolyte batteries including positive electrodes containing conventional lithium-excessive active materials (see, for example, Patent Documents 1 to 3) are manufactured on the assumption that the batteries are charged with electricity until the completion of the region with flat potential change during initial charge, and the batteries manufactured with the initial charge are intended to achieve a high discharge capacity in the potential region of 4.3 V (vs. Li/Li$^+$) or lower.

In contrast, according to the present invention, a nonaqueous electrolyte secondary battery is assumed to be manufactured without undergoing any charge process until the completion of the above-mentioned region with flat potential change, and used without undergoing any charge with electricity until the completion of the region with flat potential change. A nonaqueous electrolyte battery including a positive electrode containing a lithium-excessive active material is manufactured and used in this manner, thereby causing the above-mentioned capacity band to appear only if the battery is accidentally overcharged, and thus making it possible to provide a battery in which a sudden increase in battery voltage is not observed until reaching a higher SOC in the case where a current is forced to be further applied beyond the full charge state (SOC 100%).

However, when a positive electrode containing a lithium-excessive active material is produced without undergoing any charge process until the completion of the region with flat potential change and used without performing any charge until the completion of the region with flat potential change, the conventional lithium-excessive active material has the problem of being low in discharge capacity as presented in Comparative Examples 1-1 and 1-2.

In Patent Documents 1 to 4, the positive electrodes containing the lithium-excessive active materials are subjected to charge in initial charge-discharge until the completion of the region with flat potential change.

Patent Documents 5 and 6 disclose active materials containing lithium-transition metal composite oxides with 1<Li/Me (transition metal), but the lithium-transition metal composite oxides specifically described are, because the content of Mn is low with Ni:Co:Mn of 1:1:1 as proportions, not positive active materials in which the region with flat potential change is observed.

An object of the present invention is to provide a positive active material for a nonaqueous electrolyte secondary battery in which the discharge capacity is high even in the case of charge with electricity at a relatively low voltage, and a sudden increase in battery voltage is not observed until reaching a higher SOC, the nonaqueous electrolyte secondary battery, a method for manufacturing the battery, and a method of using the battery.

Means for Solving the Problems

One aspect of the present invention for solving the above-mentioned problems is a positive active material for a nonaqueous electrolyte secondary battery, containing a lithium-transition metal composite oxide, in which the lithium-transition metal composite oxide has an α-NaFeO$_2$ structure, with a molar ratio Li/Me of Li to the transition metal (Me) being 1.05≤Li/Me<1.4, and contains Ni and Mn, or contains Ni, Co, and Mn as the transition metal (Me), with a molar ratio Mn/Me of Mn to Me being 0.4≤Mn/Me<0.6, and a molar ratio Ni/Me of Ni to Me being 0.2≤Ni/Me≤0.6.

Another aspect of the present invention is a positive electrode for a nonaqueous electrolyte secondary battery, containing the positive active material according to the aspect mentioned above.

Yet another aspect of the present invention is a nonaqueous electrolyte secondary battery including a positive electrode, a negative electrode, and a nonaqueous electrolyte, in which the positive electrode contains the positive active material according to the aspect mentioned above, and the positive active material has a diffraction peak observed in a range of 20° or more and 22° or less in an X-ray diffraction pattern obtained with a CuKα line.

Yet another aspect of the present invention is a nonaqueous electrolyte secondary battery including a positive electrode, a negative electrode, and a nonaqueous electrolyte, in which the positive electrode contains the positive active material according to the aspect mentioned above, and with the positive electrode charged with electricity up to a positive electrode potential of 5.0 V (vs. Li/Li$^+$), a region where a potential change is relatively flat with respect to an amount of charge is observed within a positive electrode potential range of 4.5 V (vs. Li/Li$^+$) or higher and 5.0 V (vs. Li/Li$^+$) or lower.

Yet another aspect of the present invention is a nonaqueous electrolyte secondary battery including a positive electrode, a negative electrode, and a nonaqueous electrolyte, in which the positive electrode contains the positive active material according to the aspect mentioned above, and a dZ/dV value of a dZ/dV curve obtained with the positive electrode charged with electricity up to a positive electrode potential of 4.6 V (vs. Li/Li$^+$) (provided that: Z is a capacity ratio (%) at each potential, based on a capacity at reaching 4.35 V (vs. Li/Li$^+$) from charge start; and V is a positive electrode potential.) has a maximum value of 150 or more in a potential range of 4.35 V (vs. Li/Li$^+$) or higher and 4.6 V (vs. Li/Li$^+$) or lower.

Yet another aspect of the present invention is a method for manufacturing a nonaqueous electrolyte secondary battery, including: assembling a nonaqueous electrolyte secondary battery with use of the positive electrode for a nonaqueous electrolyte secondary battery; and subjecting the battery to initial charge-discharge, in which the positive electrode in the initial charge-discharge step has a maximum attainable potential of higher than 4.3 V (vs. Li/Li$^+$) and lower than 4.5 V (vs. Li/Li$^+$).

In other words, in yet another aspect of the present invention, the "nonaqueous electrolyte secondary battery" refers to a battery subjected to the above-mentioned initial charge-discharge step and finished to be ready for shipment in a factory. In the factory, charge-discharge may be performed more than once, if necessary.

Yet another aspect of the present invention is a method of using the nonaqueous electrolyte secondary battery, for use at a battery voltage at which the positive electrode has a maximum attainable potential of higher than 4.3 V (vs. Li/Li$^+$) and lower than 4.5 V (vs. Li/Li$^+$) in a full charge state (SOC 100%).

Advantages of the Invention

According to the present invention, it is possible to provide a positive active material for a nonaqueous electrolyte secondary battery in which the discharge capacity is high even in the case of charge with electricity at a relatively low voltage, and a sudden increase in battery voltage is not observed until reaching a higher SOC, the nonaqueous electrolyte secondary battery, a method for manufacturing the battery, and a method of using the battery.

MODE FOR CARRYING OUT THE INVENTION

Figure 1:
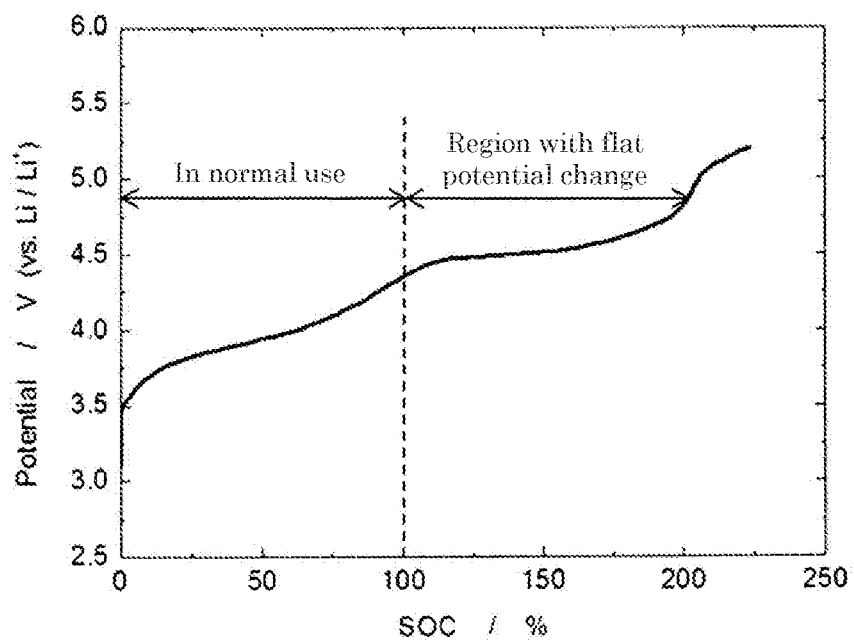
FIG. 1 is a conceptual diagram showing a typical charge curve of a positive electrode with a lithium-excessive active material, and a depth of charge (SOC %) in production and use as an assumption of the present invention and a region with flat potential change.

The present inventor has found, as a result of variously studying the crystal structure of a transition metal hydroxide precursor for use in the production of a lithium-transition metal composite oxide and the composition and crystallinity of the lithium-transition metal composite oxide, conditions under which an active material is obtained for a large amount of charge in a region with flat potential change, and for a high discharge capacity in the case of the production without undergoing any charge process until the completion of the region with flat potential change and the use without performing any charge until the completion of the region with flat potential change. The details will be described below.

<Positive Active Material for Nonaqueous Electrolyte Secondary Battery>

One embodiment of the present invention based on the above-mentioned findings is a positive active material for a nonaqueous electrolyte secondary battery, containing a lithium-transition metal composite oxide, in which the lithium-transition metal composite oxide has an α-NaFeO$_2$ structure, with a molar ratio Li/Me of Li to the transition metal (Me) being 1.05≤Li/Me<1.4, and contains Ni and Mn, or contains Ni, Co, and Mn as the transition metal (Me), with a molar ratio Mn/Me of Mn to Me being 0.4≤Mn/Me<0.6, and a molar ratio Ni/Me of Ni to Me being 0.2≤Ni/Me≤0.6.

The molar ratio Li/Me may be 1.15≤Li/Me.
The molar ratio Mn/Me may be Mn/Me<0.55.
The molar ratio Ni/Me may be 0.25≤Ni/Me.
The molar ratio Ni/Me may be Ni/Me<0.6.
A molar ratio Co/Me of Co to Me may be Co/Me≤0.35.

<Composition of Lithium-Transition Metal Composite Oxide>

In one embodiment of the present invention, a lithium-transition metal composite oxide represented by the composition formula Li$_{1+\alpha}$Me$_{1-\alpha}$O$_2$ (α>0) is a so-called "lithium-excessive type" in which the molar ratio Li/Me of Li to the transition metal element Me, represented by (1+α)/(1−α), is greater than 1. The Li/Me is preferably 1.05 or more, and more preferably 1.10 or more. Further, the ratio is preferably less than 1.40, and more preferably 1.30 or less. Within this range, the discharge capacity of the positive active material is improved. Further, the molar ratio Li/Me is more preferably 1.15 or more, and further preferably 1.20 or more in that the amount of charge in the region with flat potential change can be further increased.

The molar ratio Mn/Me of Mn to the transition metal element Me is 0.4 or more and less than 0.6. The molar ratio of 0.4 or more allows the amount of charge in the region with flat potential change to be increased, and the ratio of less than 0.6 allows a positive active material that is high in discharge capacity in the case where the material is produced without undergoing any charge process until the completion of the region with flat potential change, and used without performing any charge until the completion of the region with flat potential change. The Mn/Me is preferably 0.55 or less, more preferably less than 0.55, further preferably 0.53 or less, and most preferably 0.50 or less.

Co contained in the lithium-transition metal composite oxide has the effect of improving the initial efficiency, but costs high because Co is a rare resource. Thus, the molar ratio Co/Me of Co to the transition metal element Me is preferably 0.35 or less, more preferably 0.20 or less, and further preferably 0.13 or less, and may be 0.

The molar ratio Ni/Me of Ni to the transition metal element Me is more than 0.20 and 0.60 or less. The Ni/Me is preferably 0.25 or more. Further, the ratio is preferably less than 0.60, and more preferably 0.55 or less. Within this range, the reduced polarization in charge-discharge increases the discharge capacity in the case of use without any charge until the completion of the region with flat potential change.

The use of, for the positive active material, the lithium-transition metal composite oxide that has the composition as mentioned above makes it possible to obtain a nonaqueous electrolyte secondary battery that is large in the amount of charge electricity in the region with flat potential change, and high in discharge capacity in the case where the material is produced without undergoing any charge process until the completion of the region with flat potential change, and used without performing any charge until the completion of the region with flat potential change.

<Crystal Structure and Crystallinity of Lithium-Transition Metal Composite Oxide>

The lithium-transition metal composite oxide according to one embodiment of the present invention has an $\alpha$-NaFeO$_2$ structure. The above-mentioned lithium-transition metal composite oxide synthesized (before charge-discharge) belongs to the space group P3$_1$12 or R3-m. The lithium-transition metal composite oxide that belongs to the space group P3$_1$12 has a superlattice peak (a peak found in the Li[Li$_{1/3}$Mn$_{2/3}$]O$_2$-type monoclinic crystal) observed in the range of 2$\theta$=20° or more and 22° or less on an X-ray diffraction pattern obtained with a CuK$\alpha$ tube. If once charge and discharge are performed up to a potential of 4.5 V (vs. Li/Li$^+$) or higher, however, the symmetry of the crystal will change with the extraction of Li in the crystal, thereby resulting in disappearance of the above-mentioned superlattice peak, and the above-mentioned lithium-transition metal composite oxides will then belong to the space group R3-m.

In this regard, P3$_1$12 refers to a crystal structure model obtained by subdividing the atomic locations of 3a, 3b, and 6c sites in R3-m, and the P3$_1$12 model is adopted in the case where ordering is observed in the atomic arrangement in R3-m. It is to be noted that "R3-m" is originally written with a bar "-" on "3" of "R3m".

For the lithium-transition metal composite oxide, in the case where the space group R3-m is, based on the X-ray diffraction pattern, used in the crystal structure model, the half width of the diffraction peak that belongs to the (104) plane, that is, the value of FWHM (104) is preferably 0.2° or more and 0.6° or less. The FWHM (104) is an index of crystallinity from all directions. If the FWHM (104) is excessively small, the crystallization will proceed excessively, and then make the crystallites larger, thereby resulting in insufficient diffusion of Li ions and thus decreasing the discharge capacity. If the FWHM (104) is excessively large, the crystallinity is low, thus decreasing the transport efficiency of Li ions and also decreasing the discharge capacity. The value of the FWHM(104) in the range mentioned above allows the discharge capacity to be increased, which is preferred.

It is to be noted that the diffraction peak at 2$\theta$=44.1°±1° is indexed to the (114) plane in the space group P3$_1$12 and the (104) plane in the space group R3-m. Accordingly, for the oxide that belongs to the space group P3$_1$12, the description as (104) in this specification should be read as (114).

<X-Ray Diffraction Measurement>

In this specification, the diffraction peak and half width of the lithium-transition metal composite oxide are measured with the use of an X-ray diffractometer (from Rigaku, model name: MiniFlex II). Specifically, the measurement is made in accordance with the following conditions and procedure.

The X-ray source is CuK$\alpha$, and the acceleration voltage and the current are respectively 30 kV and 15 mA. The sampling width is 0.01 deg, the scanning time is 15 min (the scan speed is 5.0), the divergence slit width is 0.625 deg, the light receiving slit is open, and the scattering slit width is 8.0 mm. For the obtained X-ray diffraction data, the half width FWHM(104) for the diffraction peak at 2$\theta$=44±1° on the X-ray diffraction pattern, indexed to the (104) plane in the space group R3-m, is calculated with the use of accessory software "PDXL" of the X-ray diffractometer without removing the peak derived from CuK$\alpha$2.

<Positive Electrode for Nonaqueous Electrolyte Secondary Battery, and Nonaqueous Electrolyte Secondary Battery>

Another embodiment of the present invention is a positive electrode for a nonaqueous electrolyte secondary battery, containing the positive active material according to the embodiment mentioned above.

Yet another embodiment of the present invention is a nonaqueous electrolyte secondary battery including a positive electrode, a negative electrode, and a nonaqueous electrolyte, in which the positive electrode contains the positive active material according to the embodiment mentioned above, and the positive active material has a diffraction peak observed in the range of 20° or more and 22° or less in an X-ray diffraction pattern obtained with a CuK$\alpha$ line.

<Confirmation of Diffraction Peak>

In the X-ray diffraction measurements and X-ray diffraction patterns obtained with a CuK$\alpha$ line for the positive active materials for use in the nonaqueous electrolyte secondary battery according to the present embodiment and the positive active material included in the positive electrode included in the nonaqueous electrolyte secondary battery according to the present embodiment, the diffraction peaks observed in the range of 20° or more and 22° or less is confirmed in accordance with the procedure and conditions described later. In this regard, the term "observed" means that the ratio of the difference ($I_{21}$) between the maximum value and minimum value of the intensity within the diffraction angle range of 20° or more and 220 or less to the difference ($I_{18}$) between the maximum value and minimum value of the intensity within the diffraction angle range of 17° or more and 19° or less, that is, the value of "$I_{21}/I_{18}$" falls within the range of 0.001 or more and 0.1 or less.

The lower part of FIG. 2, which relates to a nonaqueous electrolyte secondary battery according to Example 1 described later, shows, in a range including 20° or more and 22° or less, an X-ray diffraction pattern measured in accordance with the procedure described below, for a positive electrode in the complete discharge state after charge-discharge with the charge upper limit potential of 4.25 V (vs. Li/Li$^+$) and the discharge lower limit potential of 2.0 V (vs. Li/Li$^+$). In this case, a diffraction peak is observed in the range of 20° to 22°.

Figure 2:
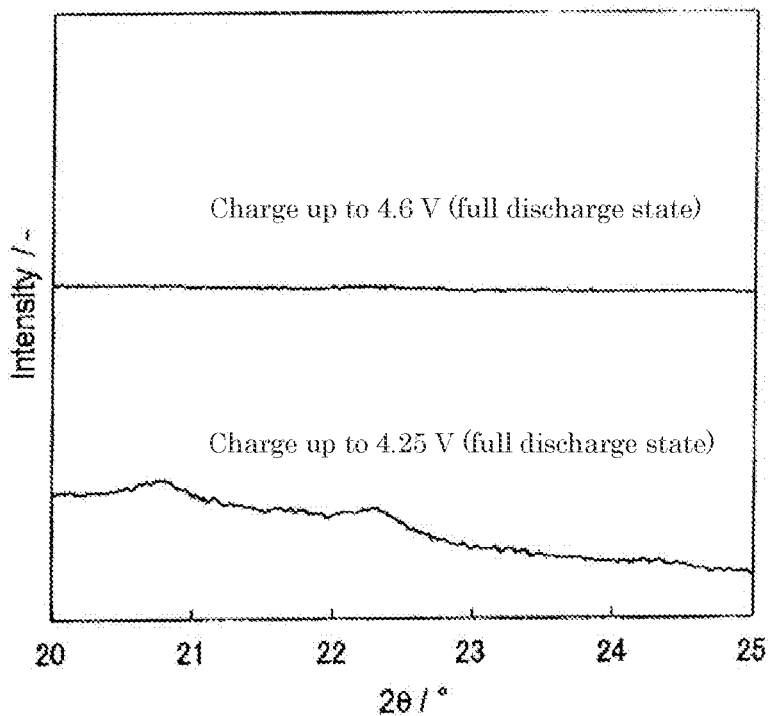
FIG. 2 shows X-ray diffraction patterns of positive active materials included in a battery according to an embodiment of the present invention and a battery according to a conventional example.

In contrast, the upper part of FIG. 2, with respect to the positive electrode of the same nonaqueous electrolyte secondary battery according to Example 1, shows, in a range including 20° or more and 22° or less, an X-ray diffraction pattern measured in accordance with the procedure mentioned above, for the positive electrode in the complete discharge state after charge-discharge with the charge upper limit potential of 4.6 V (vs. Li/Li$^+$) and the discharge lower limit potential of 2.0 V (vs. Li/Li$^+$). In this case, the diffraction peak in the range of 20° to 22° is disappeared.

Furthermore, with respect to the positive electrode of the same nonaqueous electrolyte secondary battery according to Example 1, the same X-ray diffraction pattern as in the upper part of FIG. 2 was obtained by measurement in accordance with the procedure mentioned above, for the positive electrode in the complete discharge state after first charge-discharge with the charge upper limit potential of 4.6 V (vs. Li/Li$^+$) and the discharge lower limit potential of 2.0 V (vs. Li/Li$^+$) and then second charge-discharge with the charge upper limit potential of 4.25 V (vs. Li/Li$^+$) and the discharge lower limit potential of 2.0 V (vs. Li/Li$^+$). More specifically, the diffraction peak in the range of 20° or more and 22° or less will not appear again, and as mentioned above, if once the battery is charged with electricity up to a potential of 4.5

V (vs. Li/Li$^+$) or higher, the peak in the range of 20° or more and 22° or less will disappear.

The battery according to the present embodiment has a diffraction peak observed in the range of 20° or more and 22° or less in the X-ray diffraction pattern of the positive active material, even in the X-ray diffraction measurement after charge-discharge in accordance with the above-mentioned procedure, and it is thus determined that the battery according to the present embodiment is a battery used at potentials of lower than 4.5 V (vs. Li/Li$^+$), including the potential in the first charge-discharge.

Yet another embodiment of the present invention is a nonaqueous electrolyte secondary battery including a positive electrode, a negative electrode, and a nonaqueous electrolyte, in which the positive electrode contains the positive active material according to the embodiment mentioned above, and with the positive electrode charged with electricity up to a positive electrode potential of 5.0 V (vs. Li/Li$^+$), a region where the potential change is relatively flat with respect to the amount of charge (hereinafter, also referred to as a "region with flat potential change") is observed within the positive electrode potential range of 4.5 V (vs. Li/Li$^+$) or higher and 5.0 V (vs. Li/Li$^+$) or lower.

Yet another embodiment of the present invention is a nonaqueous electrolyte secondary battery including a positive electrode, a negative electrode, and a nonaqueous electrolyte, in which the positive electrode contains the positive active material according to the embodiment mentioned above, and the dZ/dV value of the dZ/dV curve obtained with the positive electrode charged with electricity up to a positive electrode potential of 4.6 V (vs. Li/Li$^+$) (provided that: Z is a capacity ratio (%) at each potential, based on the capacity at reaching 4.35 V (vs. Li/Li$^+$) from the charge start; and V is a positive electrode potential.) has a maximum value of 150 or more in the potential range of 4.35 V (vs. Li/Li$^+$) or higher and 4.6 V (vs. Li/Li$^+$) or lower.

The nonaqueous electrolyte secondary batteries according to the yet other embodiments of the present invention are each used at a battery voltage at which the positive electrode has a maximum attainable potential of higher than 4.3 V (vs. Li/Li$^+$) and lower than 4.5 V (vs. Li/Li$^+$) in a full charge state (SOC 100%).

Figure 3:
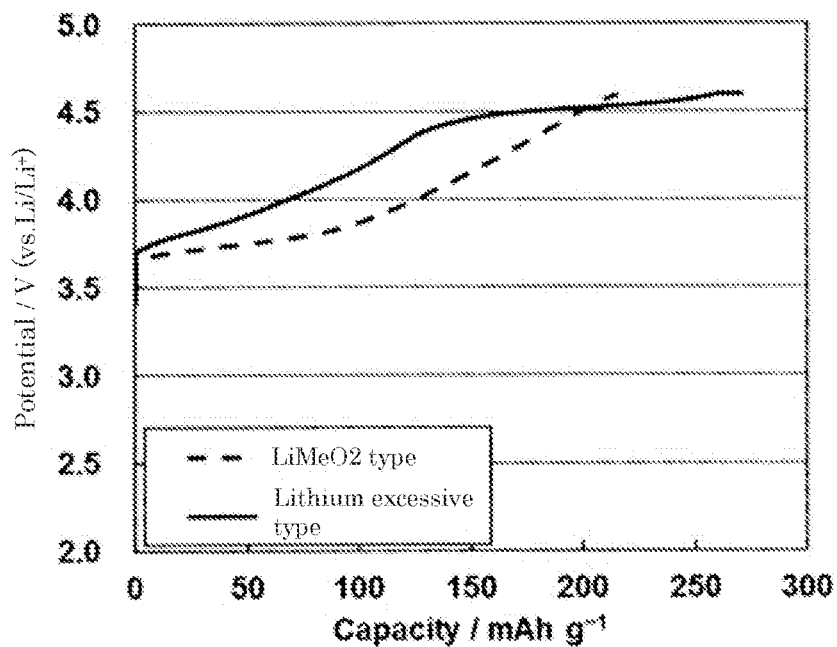
FIG. 3 is a diagram showing potential changes with respect to the amount of charge, observed in the case of "LiMeO$_2$-type" and "lithium-excessive type" active materials subjected to first charge up to 4.6 V (vs. Li$^+$).

The principle of the function mechanism of the present invention will be described with reference to FIG. 3. The solid line in FIG. 3 shows the change in the positive electrode potential in the case of assembling a nonaqueous electrolyte secondary battery, including a positive electrode with a lithium-transition metal composite oxide according to the present embodiment (referred to as a lithium excessive type) as a positive active material and a negative electrode with a Li metal, and first charging the battery with electricity with the charge upper limit potential of 4.6 V (vs. Li/Li$^+$). The broken line shows the change in potential, in the case of similar first charge with electricity to that for the solid line, a battery configured similarly except for including a positive electrode with a commercially available LiNi$_{1/3}$Co$_{1/3}$Mn$_{1/3}$O$_2$ (referred to as a "LiMeO$_2$ type") as a positive active material. In the case of the Li-excessive active material, a region with flat potential change is observed in the potential range of 4.45 V (vs. L/Li$^+$) or higher and 4.6 V (vs. Li/Li$^+$) or lower. In contrast, in the case of the LiMeO$_2$-type active material, a region with flat potential change is not observed in the potential range of 4.45 V (vs. Li/Li$^+$) or higher and 4.6 V (vs. Li/Li$^+$) or lower.

It is to be noted that the potential at which the flat region is observed and the capacity for charge-discharge are slightly different depending on the properties such as the composition even in the case of the lithium-excessive positive electrode, and this diagram is merely an example.

The nonaqueous electrolyte secondary battery according to the present embodiment has the positive electrode with the "lithium-excessive" active material in which the region with flat potential change is observed in charge with electricity up to 5.0 V (vs. Li/Li$^+$), and in the initial charge-discharge step, the battery is completed without any charge with electricity until the completion of the charge process in which the flat region is observed. The maximum attainable potential of the positive electrode in the initial charge-discharge step is preferably lower than 4.5 V (vs. Li/Li$^+$). Furthermore, the nonaqueous electrolyte secondary battery according to the present embodiment is used under charge conditions without any charge with electricity until the completion of the charge process in which the flat region is observed. Accordingly, the nonaqueous electrolyte secondary battery according to the present embodiment is not subjected even once to charge with electricity until the completion of the charge process in which the flat region is observed, from the manufacturing stage to the use, and thus, in the case of overcharge, a region where the potential change is flat with respect to the amount of charge is observed within the positive electrode potential range of 4.5 V (vs. Li/Li$^+$) or higher and 5.0 V (vs. Li/Li$^+$) or lower.

The nonaqueous electrolyte secondary battery according to the present embodiment utilizes the behavior described above, thereby making it possible to suppress a sudden increase in electrode potential until reaching a higher SOC, even if the battery is overcharged beyond the SOC 100% corresponding to the full charge state during normal use.

<Method for Confirming Region with Flat Potential Change>

In this regard, the "region with flat potential change" observed is confirmed in accordance with the following procedure. The positive electrode taken out by disassembly and a Li metal are used respectively as a working electrode and a counter electrode to prepare a test battery, the test battery is discharged down to 2.0 V (vs. Li/Li$^+$) at a current value of 10 mA per 1 g of the positive composite, and the discharge is then followed by a pause for 30 minutes. Thereafter, constant current charge is performed up to 5.0 V (vs. Li/Li$^+$) at a current value of 10 mA per 1 g of the positive composite. In this regard, the ratio of the capacity Y (mAh) at each potential to the capacity X (mAh) at the time of reaching 4.45 V (vs. Li/Li$^+$) from the start of the charge is denoted by Z (=Y/X*100(%)). A dZ/dV curve is obtained by plotting the potential on the horizontal axis and plotting, on the vertical axis, dZ/dV with the difference in potential change for the denominator and the difference in capacity ratio change for the numerator.

Figure 4:
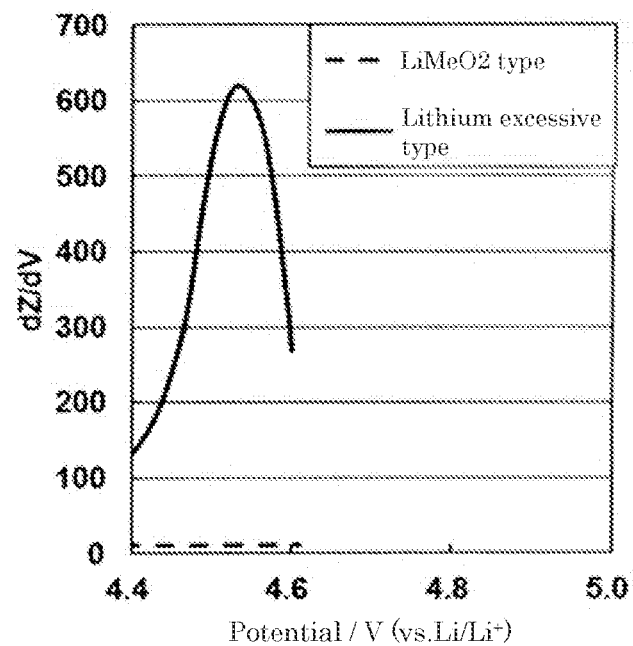
FIG. 4 is a diagram for describing "a region where the potential change is relatively flat with respect to the amount of charge" in a nonaqueous electrolyte secondary battery according to an embodiment of the present invention.

The solid line in FIG. 4 is an example of a dZ/dV curve in the case of assembling a nonaqueous electrolyte secondary battery including a positive electrode with a lithium-excessive active material as a positive active material and a negative electrode with a Li metal, first charging the battery up to lower than 4.5 V (vs. Li/Li$^+$), and charging the battery with electricity up to 4.6 V (vs. Li/Li$^+$). The dZ/dV curve has, as can be seen from the calculation formula, a dZ/dV value increased as the potential change is decreased with respect to the capacity ratio change, and a dZ/dV value decreased as the potential change is increased with respect to the capacity ratio change. In the charge process for the lithium-excessive active material in the potential region in excess of 4.5 V (vs. Li/Li$^+$), the value of dZ/dV is increased when the region with flat potential change starts to appear. Thereafter, when the region with flat potential change ends to start a rise in potential again, the value of dZ/dV is decreased. More specifically, the dZ/dV curve has a peak observed. In this regard, in the case where the maximum value of the dZ/dV value in the range from 4.5 V (vs. Li/Li$^+$) to 5.0 V (vs. Li/Li$^+$) shows 150 or more, it is determined that the region where the potential change is flat with respect to the amount of charge is observed. In contrast, the broken line is a dZ/dV curve of a battery configured similarly except for including a positive electrode with a commercially available LiMeO$_2$ as a positive active material. Corresponding to the fact that the region with flat potential change is not observed, such a peak as in the lithium excessive type is not observed. It is to be noted that in this specification, the normal use refers to a case of using the nonaqueous electrolyte secondary battery by employing charge-discharge conditions recommended or specified for the nonaqueous electrolyte secondary battery, or in the case where a charger for the nonaqueous electrolyte secondary battery is prepared, refers to a case of using the nonaqueous electrolyte secondary battery with the charger applied.

<Press Density of Lithium-Transition Metal Composite Oxide>

The lithium-transition metal composite oxide according to the first embodiment preferably further has a density (hereinafter, referred to as a "press density") of 2.7 g/cm$^3$ or more in the case of press at a pressure of 40 MPa.

The press density of 2.7 g/cm$^3$ or more and the above-mentioned composition satisfied are preferable because it is possible to increase discharge capacity in the case where the material is produced without undergoing any charge process until the completion of the region with flat potential change, and used without performing any charge until the completion of the region with flat potential change.

It is to be noted that, if Mn/Me is smaller than 0.4 even with Li/Me of 1.1 as presented in Comparative Example 2-5 described later, and if Li/Me is 1.0 as presented in Comparative Example 2-4, the discharge capacity is high in the relatively low potential range, whereas a region with flat potential change is not observed.

Here are conditions for press density measurement in this specification.

Figure 5:
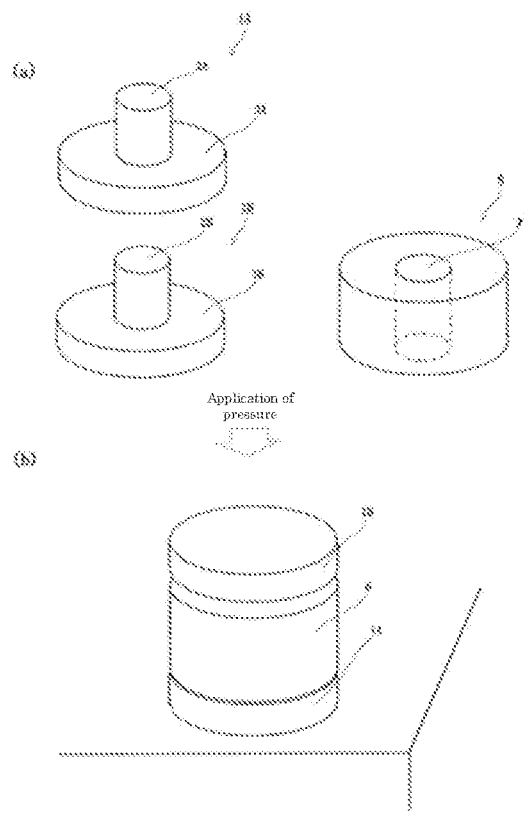
FIG. 5 is a conceptual diagram of a press density measurement device.

The measurement is performed in air at room temperature of 20° C. or higher and 25° C. lower. FIG. 5 shows a conceptual diagram of the device used for the measurement of the press density. Prepared is a pair of measurement probes 1A and 1B. The measuring probes 1A and 1B have measurement surfaces 2A and 2B each obtained by flattening one end of a cylinder made of stainless steel (SUS304) with a diameter of 8.0 mm (±0.05 mm), with the other ends of the cylinders fixed vertically to bases 3A and 3B (with an area of 10 cm$^2$ or more) made of stainless steel. Prepared is a side body 6 provided, in the center of the acrylic cylinder, with a through hole 7 adjusted in terms of inner diameter and polished such that the stainless steel cylinder can naturally descend slowly in the air due to gravity. The upper and lower surfaces of the side body 6 are smoothed by polishing.

One of the measurement probes, the measurement probe 1A is placed on a flat desk such that the measurement surface 2A faces upward, and the cylindrical part of the measurement probe 1A is inserted into the through hole 7 of the side body 6 so as to cover the side body 6 from above. The other measurement probe 1B is inserted from above the through hole 7 with the measurement surface 2B facing down, and the distance between the measurement surfaces 2A and 2B is set to zero. In this regard, the distance between the base 3B of the measurement probe 1B and the base 3A of the measurement probe 1A is measured with the use of a caliper.

Next, the measurement probe 1B is pulled out, 0.3 g of a sample powder to be measured is input from above the through hole 7 with a medicine spoon, and again, the measurement probe 1B is inserted from above the through hole 7 with the measurement surface 2B facing down. With the use of a manual hydraulic press equipped with a pressure gauge, where the area of the contact with a jig (in this figure, the area of contact with the 3A surface) is 10 cm$^2$, pressure is applied from above the measurement probe 1B until the pressure scale of the press reaches a value from which the pressure applied to the active material is calculated to be 40 MPa. It is to be noted that after the scale reaches the numerical value, no additional pressure is applied even if the value indicated by the scale is decreased. Thereafter, in this state, the distance between the base 3B of the measurement probe 1B and the base 3A of the measurement probe 1A is measured again with the use of a caliper. The density of the sample to be measured under pressure is calculated from the difference (cm) from the distance before the input of the sample to be measured, the area (0.50 cm$^2$) of the through hole, and the input amount (0.3 g) of the sample to be measured, and defined as the press density (g/cm$^3$). It is to be noted that the pressure applied to the active material is calculated from the relation between the area of contact with the jig and the area of the measurement surface (the area of contact with the powder).

It is to be noted that the tap density of the lithium-transition metal composite oxide is not necessarily correlated with the effect of the present embodiment, but the tap density is preferably high to some extent in order to achieve a high press density. From this viewpoint, the tap density is preferably 1.5 g/cm$^3$ or more, more preferably 1.6 g/cm$^3$ or more, and further preferably 1.7 g/cm$^3$ or more.

The tap density in this specification is measured in accordance with the following procedure.

Employed is a value that is obtained in a manner that the volume of the sample to be measured after putting 2 g±0.2 g of the sample powder to be measured into a measuring cylinder of 10$^{-2}$ dm$^3$, and counting 300 times with the use of a tapping device from REI ELECTRIC CO. LTD. is divided by the mass of the put powder.

The sample to be subjected to the various measurements mentioned above is prepared in accordance with the following procedure.

If the sample is a lithium-transition metal composite oxide powder before positive electrode preparation (a powder before charge-discharge), the sample is directly subjected to the measurements. In the case of disassembling the battery and then collecting a sample from the electrode removed, the battery is, before disassembling the battery, subjected to constant current discharge at a current value (A) corresponding to 1/10 of the nominal capacity (Ah) of the battery until reaching the battery voltage corresponding to the lower limit of the voltage specified for normal use, thereby bringing the battery into a full discharge state. As long as the battery has a metallic lithium electrode for the negative electrode as a result of the disassembly, the positive composite collected from the positive electrode plate is used as a measurement target without performing the additional work described below. In the case of the battery without a metallic lithium electrode for the negative electrode, for providing precise control over the positive electrode potential, a battery is, after disassembling the battery and then removing the positive electrode plate, assembled with a metallic lithium electrode as a counter electrode, subjected to constant current discharge at a current value of 10 mA per 1 g of positive composite until the voltage reaches 2.0 V (positive electrode potential of 2.0 V (vs. Li/Li⁺)) and adjusted to a full discharge state, and then re-disassembled. The removed positive electrode plate is washed with dimethyl carbonate to thoroughly clean the nonaqueous electrolyte adhering to the electrode, and dried at room temperature all night and all day, and then, the composite on the current collector is collected. The above-mentioned work from the disassembly of the battery to the re-disassembly thereof, and the work of cleaning and drying the positive electrode plate are performed in an argon atmosphere with a dew point of −60° C. or lower.

For the sample to be subjected to X-ray diffraction measurement, the collected composite is lightly crushed in an agate mortar, and placed in a sample holder for X-ray diffraction measurement and then subjected to the measurement.

For the samples to be subjected to the measurements of the press density and tap density, the composite is subjected to firing for 4 hours at 600° C. with the use of a small-size electric furnace to remove the conductive agent and the binder, and the lithium-transition metal composite oxide particles are taken out, and subjected to the above-mentioned measurement as an active material powder (powder after charge-discharge).

<Transition Metal Hydroxide Precursor, and Method for Producing Precursor>

The transition metal hydroxide precursor for use in the production of the lithium-transition metal composite oxide contained in the positive active material for a nonaqueous electrolyte secondary battery according to an embodiment of the present invention is preferably a mixture of: a compound that contains Ni and Mn or contains Ni, Co, and Mn as transition metals (Me) and has an αNi(OH)₂-type crystal structure (hereinafter, referred to as αMe(OH)₂); and a compound that has a ßNi(OH)₂-type crystal structure (hereinafter, referred to as ßMe(OH)₂).

The same as in the case of one embodiment of the present invention applies to the reason for limiting the molar ratio Mn/Me and molar ratio Ni/Mn of the above-mentioned transition metal hydroxide precursor (hereinafter, also referred to simply as a "precursor"), and the reason for limiting the molar ratio Li/Me of the lithium-transition metal composite oxide prepared with the use of the precursor.

The precursor that has a crystal structure containing αMe(OH)₂ and ßMe(OH)₂ has a tap density that can be increased as compared with a precursor that has a crystal structure of an αMe(OH)₂ single phase or a ßMe(OH)₂ single phase. Then, with the use of this precursor, a lithium-transition metal composite oxide with a high press density can be produced. The reason why the crystal structure of the transition metal hydroxide precursor is associated with the tap density of the transition metal hydroxide precursor and the press density of the lithium-transition metal composite oxide is not necessarily clear, but the present inventor has surmised the reason as follows. The αMe(OH)₂ single-phase transition metal hydroxide is large in the primary particle size of αMe(OH)₂ that has a plate-like form, and the volume of voids between the primary particles constituting secondary particles is thus believed to be increased, thus decreasing the density of the transition metal hydroxide precursor. In addition, the conditions for the production of the transition metal hydroxide under which the ßMe(OH)₂ single phase is produced have high pH, and nucleation is thus believed to be prioritized over particle growth of the transition metal hydroxide, thereby resulting in the production of many fine particles, and thus also decreasing the density of the transition metal hydroxide precursor. Accordingly, the employment of the conditions for the production of the transition metal hydroxide under which a mixed phase of αMe(OH)₂ and ßMe(OH)₂ is produced is believed to provide a transition metal hydroxide precursor with a high tap density, and the precursor with a high tap density is used to synthesize a lithium-transition metal composite oxide, thus providing a lithium-transition metal composite oxide with a high press density.

The precursor can be produced by reacting a compound containing Ni and Mn or containing Ni, Co, and Mn in an aqueous solution with pH of 10.2 or less.

The pH in the case of producing the transition metal hydroxide precursor by a coprecipitation method is typically 10.5 or more and 14 or less, as described in Patent Documents 1, 2 and the like. Further, as described in Patent Document 3, the hydroxide precursor produced at pH 11.5 is a single phase of ßMe(OH)₂. In contrast, a precursor containing αMe(OH)₂ and ßMe(OH)₂ can be produced by reacting a transition metal compound in an aqueous solution with pH of 10.2 or less. The use of, for the positive active material, a lithium-transition metal composite oxide prepared from such a precursor reduces the resistance of the electrode, thus increasing the amount of Li that can be extracted by charge with a potential at which the potential change fails to reach the flat region, for example, 4.35 V (vs. Li/Li⁺) as an upper limit, and allowing the reversible capacity to be increased.

In the case of producing the precursor, an alkali metal hydroxide, a complexing agent, and an alkaline solution containing a reducing agent are preferably added along with a solution containing a transition metal (Me) into a reaction tank kept alkaline to coprecipitate the transition metal hydroxide.

As the complexing agent, ammonia, ammonium sulfate, ammonium nitrate, or the like can be used, and ammonia is preferable. A precursor that has a higher tap density can be produced by a crystallization reaction with the use of a complexing agent.

The reducing agent is preferably used along with the complexing agent. As the reducing agent, hydrazine, sodium borohydride, or the like can be used, and hydrazine is preferable in order to obtain a lithium-transition metal composite oxide in which the active material has a high press density.

As the alkali metal hydroxide (neutralizing agent), sodium hydroxide, lithium hydroxide, or potassium hydroxide can be used.

In preparing the hydroxide precursor, among Ni, Co, and Mn, Mn is more easily oxidized, it is not easy to prepare a coprecipitated precursor in which Ni and Mn, or Ni, Co, and Mn are homogeneously distributed in the divalent states, and thus, homogeneously mixing Ni and Mn, or Ni, Co, and Mn at the atomic level is likely to be insufficient. In the compositional range according to a second embodiment of the present invention, the molar ratio Mn/Me of Mn to Me is 0.4 or more, and it is thus important to remove the dissolved oxygen in the aqueous solution. Examples of the method for removing the dissolved oxygen include a method of bubbling a gas containing no oxygen ($O_2$). The gas containing no oxygen is not to be considered limited, and a nitrogen gas, an argon gas, and the like can be used.

As mentioned above, the pH (the reaction pH in the reaction tank) in the step of producing the hydroxide precursor by coprecipitating a compound containing Ni and Mn or containing Ni, Co, and Mn in a solution is preferably 10.2 or less in order to obtain a precursor with a high tap density, containing αMe(OH)₂ and ßMe(OH)₂. In addition, the pH mentioned above allows the particle growth rate to be promoted, thus making it possible to reduce the stirring duration after the completion of dropping the raw material aqueous solution. It is to be noted that if the pH is excessively low, a precursor of an αMe(OH)$_2$ single phase is produced (see Example 1-12 described later), and thus, the reaction pH is preferably more than 9.

Figure 6:
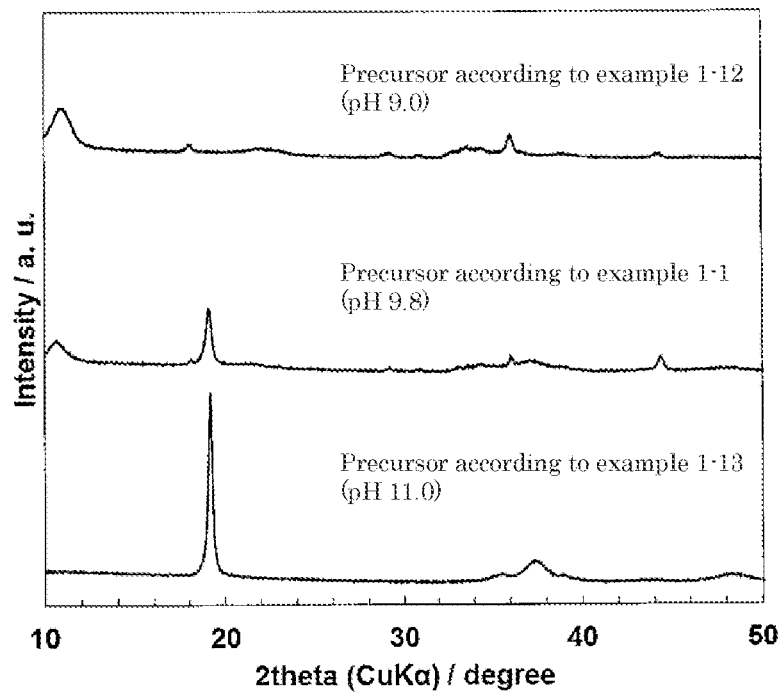
FIG. 6 shows X-ray diffraction patterns of hydroxide precursors.

Whether the precursor has a mixed phase of αMe(OH)$_2$ and ßMe(OH)$_2$ is determined by the above-mentioned X-ray diffraction measurement. As shown in FIG. 6, the αNi(OH)$_2$-type crystal structure (αMe(OH)$_2$) has the largest peak at 2θ=10° or more and 12° or less, and the ßNi(OH)$_2$-type crystal structure (ßMe(OH)$_2$) has the largest peak at 2θ=18° or more and 20° or less. Thus, after processing the background with accessory software, $I_{11}/I_{19}$ with the maximum value of the peak intensity at 2θ=10° or more and 12° or less for the numerator and the maximum value of the peak intensity at 2θ=18° or more and 20° or less for the denominator is calculated, thereby making it possible to determine how much αMe(OH)$_2$ and ßMe(OH)$_2$ are mixed.

The lower limit of $I_{11}/I_{19}$ is preferably 0.04, more preferably 0.05, and most preferably 0.08. The upper limit of $I_{11}/I_{19}$ is preferably 3.0, more preferably 2.0, and most preferably 1.0.

Further, a method is also known in which a transition metal carbonate precursor is used as a precursor for the positive active material for a nonaqueous electrolyte secondary battery. However, the use of a transition metal carbonate precursor typically generates a gas (mainly carbon dioxide) from the precursor during the firing process. Due to this gas generation, many pores are generated in the positive active material, thus decreasing the press density of the positive active material.

Examples of the raw materials for the hydroxide precursor include: a manganese oxide, a manganese carbonate, a manganese sulfate, a manganese nitrate, and a manganese acetate as the Mn compound; a nickel hydroxide, a nickel carbonate, a nickel sulfate, a nickel nitrate, a nickel acetate as the Ni compound; and a cobalt sulfate, cobalt nitrate, and a cobalt acetate as the Co compound.

Preferable is a method in which a mixed alkali solution containing an alkali metal hydroxide (neutralizing agent) such as sodium hydroxide, a complexing agent such as ammonia, and a reducing agent such as hydrazine is appropriately delivered by drops while delivering an aqueous solution of the raw materials for the hydroxide precursor (an aqueous solution containing transition metals) by drops for supplying the solution. The concentration of the alkali metal hydroxide delivered by drops is preferably 1.0 M or more and 8.0 M or less. The concentration of the complexing agent is preferably 0.4 M or more, and more preferably 0.6 M or more. Furthermore, the concentration of the complexing agent is preferably 2.0 M or less, more preferably 1.6 M or less, and further preferably 1.5 M or less. The concentration of the reducing agent is preferably 0.05 M or more and 1.0 M or less, and more preferably 0.1 M or more and 0.5 M or less. The tap density of the hydroxide precursor can be increased by decreasing the pH of the reaction tank and adjusting the ammonia (complexing agent) concentration to 0.6 M or more.

The dropping rate of the raw material aqueous solution has a great influence on element distribution homogeneity in one particle of the hydroxide precursor produced. In particular, Mn is less likely to form a uniform element distribution with Ni and Co, thus requiring attention. The preferable dropping rate is influenced by the size of the reaction tank, the stirring conditions, pH, the reaction temperature, and the like, and preferably 30 mL/min or less. In order to improve the discharge capacity, the dropping rate is more preferably 10 mL/min or less, most preferably 5 mL/min or less.

Further, in the presence of a complexing agent such as ammonia, in the reaction tank and under a certain convection condition applied, the stirring is further continued after the completion of dropping the raw material aqueous solution, thereby promoting the rotation of the particles and the revolution thereof in the stirring tank, and in this process, the particles gradually grow into concentric spherical shapes while colliding with each other. More specifically, the hydroxide precursor is formed through a two-step reaction of: a metal complex forming reaction developed when the raw material aqueous solution is dropped in the reaction tank; and a precipitation forming reaction developed during the retention of the metal complex in the reaction tank. Accordingly, a hydroxide precursor that has a target particle size can be obtained by appropriately selecting the time period for further continuing the stirring after the completion of dropping the raw material aqueous solution.

The preferable duration of stirring after the completion of dropping the raw material aqueous solution is influenced by the size of the reaction tank, the stirring conditions, pH, the reaction temperature, and the like, and is preferably 0.5 hour or longer, and more preferably 1 hour or longer in order to grow the particles as uniform spherical particles. Furthermore, in order to reduce the possibility of insufficient power performance in the low SOC region of the battery due to the excessively increased particle size, the duration is preferably 15 hours or shorter, more preferably 10 hours or shorter, and most preferably 5 hours or shorter.

Furthermore, the particle size D50 corresponding to an accumulated volume of 50% in the particle size distribution of the secondary particles of the hydroxide precursor and the lithium-transition metal composite oxide is preferably 13 μm or less. For the purpose, for example, in the case where the pH is controlled to be 9.1 or more and 10.2 or less, the stirring duration is preferably 1 hour or longer and 3 hours or shorter.

In the case where the hydroxide precursor particles are prepared with the use of, as a neutralizing agent, sodium compound such as sodium hydroxide, sodium ions adhering to the particles are preferably removed by washing in the subsequent washing step. For example, conditions can be employed such that the frequency of washing with 500 mL of ion-exchange water is 6 times or more in extracting the prepared hydroxide precursor by suction filtration.

<Method for Producing Lithium-Transition Metal Composite Oxide>

The lithium-transition metal composite oxide contained in the positive active material for a nonaqueous electrolyte secondary battery according to an embodiment of the present invention can be produced by mixing the transition metal hydroxide precursor prepared in the manner mentioned above with a lithium compound, and firing the mixture at 750° C. or higher and 1000° C. or lower.

The firing temperature in the range mentioned above allows the crystallinity of the lithium-transition metal composite oxide represented by FWHM (104) to fall within a range that is suitable for the purpose of the present invention.

As the lithium compound, lithium hydroxide, lithium carbonate, lithium nitrate, lithium acetate, and the like can be used. However, the amount of the lithium compound is preferably adjusted for about 1 mol % to 5 mol % in excess, in consideration of the lithium compound partially disappearing during the firing.

The firing temperature affects the reversible capacity of the active material.

The excessively high firing temperature causes the resulting active material to deteriorate with an oxygen release reaction, and has a tendency to result in the observation of a monoclinic phase defined by the $Li[Li_{1/3}Mn_{2/3}]O_2$ type in addition to the main hexagonal phase, as a phase separated, not as a solid solution phase. Excessively including such a separated phase is not preferable because the phase leads to a decrease in the reversible capacity of the active material. Such a material has impurity peaks observed around 35° and around 45° on the X-ray diffraction pattern. Thus, the firing temperature is preferably lower than the temperature at which the oxygen release reaction of the active material has influence. The oxygen release temperature of the active material slightly differs depending on the composition of the active material, and in the case of producing a lithium-excessive active material with the use of the precursor according to the second embodiment, the temperature is approximately 1000° C. or higher, and the oxygen release temperature of the active material is preferably checked in advance. It should be noted that it has been confirmed that the oxygen release temperature of the hydroxide precursor is shifted to the lower temperature side, in particular, as the amount of Co contained in the sample is increased. As a method for checking the oxygen release temperature of the active material, a mixture of the hydroxide precursor and the lithium compound may be subjected to thermal mass spectrometry (TG-DTA measurement) in order to simulate the firing reaction process, but in this method, the Li component volatilized may possibly corrode platinum that is used in the sample chamber of the measurement instrument, thereby damaging the instrument, and thus, the composition crystallized to some extent in advance by employing the firing temperature of about 500° C. is preferably subjected to thermal mass spectrometry.

In contrast, if the firing temperature is excessively low, crystallization tends to proceed insufficiently, thereby degrading electrode characteristics. Sufficient crystallization makes it possible to reduce the resistance of the crystal grain boundaries, thereby promoting smooth lithium ion transport.

The inventors have found, as a result of detailed analysis of the half width of the diffraction peak of the lithium-excessive active material, that strain remains in the lattice in a sample synthesized at a temperature of lower than 750° C., whereas the synthesis at a temperature of 750° C. or higher can remove almost all of the strain. In addition, it has been found that the crystallite size is increased in proportion to the increase in synthesis temperature. Accordingly, also in the case of using the precursor according to the second embodiment, similarly, the active material is preferably produced by employing a firing temperature that causes almost no lattice strain in the system and allows particles to grow sufficiently in crystallite size, specifically, a firing temperature at which the amount of strain that affects the lattice constant is 2% or less and the crystallite size grows to 50 nm or more. It has been found that when the electrode with this active material is subjected to charge-discharge, the crystallite size remains 30 nm or more even in the charge-discharge process, although the size is changed due to expansion and contraction. More specifically, the firing temperature is selected to be as close as possible to the oxygen release temperature of the active material, thereby allowing the active material to have a remarkably high reversible capacity for the first time.

As mentioned above, the preferable firing temperature differs depending on the oxygen release temperature due to the composition of the active material, and in order to obtain an active material that has a sufficient discharge capacity under the use conditions premised by the present invention, the firing temperature is preferably 750° C. or higher and 1000° C. or lower, and more preferably from 750° C. or higher and 950° C. or lower.

<Positive Electrode for Nonaqueous Electrolyte Secondary Battery, and Nonaqueous Electrolyte Secondary Battery>

As mentioned above, another embodiment of the present invention is a positive electrode for a nonaqueous electrolyte secondary battery, containing the positive active material according to the embodiment, and yet another embodiment of the present invention is a nonaqueous electrolyte secondary battery including the positive electrode, a negative electrode, and a nonaqueous electrolyte. This will be specifically described.

<<Positive Electrode>>

The positive electrode includes a powder containing the positive active material according to the embodiment as a main component. As other components, a conductive agent, a binder, a thickener, a filler, and the like may be contained.

The powder of the positive active material preferably has an average particle size of 100 µm or less. In particular, the powder of the positive active material is preferably 15 µm or less for the purpose of improving the high power characteristics of the nonaqueous electrolyte battery. In order to obtain the powder in a predetermined shape, there are a method of preparing a precursor in a predetermined size, and a method of using a grinder, a classifier, and the like. For example, a mortar, a ball mill, a sand mill, a vibrating ball mill, a planetary ball mill, a jet mill, a counter jet mill, a swirling airflow-type jet mill, a sieve, or the like is used. Wet grinding in coexistence with water or an organic solvent such as hexane may be used for the grinding. The classification method is not particularly limited, and a sieve, a wind classifier, and the like may be used as needed, in both dry and wet manners.

The conductive agent is not limited as long as the agent is an electron conductive material that has no adverse influence on the battery performance, and typically, conductive materials such as natural graphite (flake graphite, scaly graphite, earthy graphite, etc.), artificial graphite, carbon black, acetylene black, ketjen black, carbon whiskers, carbon fibers, metals (copper, nickel, aluminum, silver, gold, etc.) powders, metal fibers, and conductive ceramic materials can be contained alone or as a mixture thereof.

Among these materials, acetylene black is preferable as the conductive agent from the viewpoint of electron conductivity and coatability. The amount of the conductive agent added is preferably 0.1% by mass or higher and 50% by mass or lower, and particularly preferably 0.5% by mass or higher and 30% by mass or lower, based on the total mass of the positive electrode or negative electrode. In particular, acetylene black subjected to grinding into ultrafine particles of 0.1 µm or more and 0.5 µm or less is preferably used, because the required carbon amount can be reduced. These mixing methods are provided by physical mixing, and ideally, homogeneous mixing. Therefore, it is possible to perform dry or wet mixing with the use of a powder mixer such as a V-type mixer, an S-type mixer, a mortar machine, a ball mill, and a planetary ball mill.

As the binder, typically, thermoplastic resins such as polytetrafluoroethylene (PTFE), polyvinylidene fluoride (PVDF), polyethylene, and polypropylene, and polymers with rubber elasticity such as ethylene-propylene-diene terpolymers (EPDM), sulfonated EPDM, styrene butadiene rubbers (SBR), and fluoro-rubbers can be used alone or as a mixture of two or more thereof. The amount of the binder added is preferably 1% by mass or higher and 50% by mass or lower, and particularly preferably 2% by mass or higher and 30% by mass or lower, based on the total mass of the positive electrode or negative electrode.

The filler is not limited as long as the filler is a material that has no adverse effect on the battery performance. Typically, olefin polymers such as polypropylene and polyethylene, amorphous silica, alumina, zeolite, glass, carbon, and the like are used. The amount of the filler added is preferably 30% by mass or lower, based on the total mass of the positive electrode or the negative electrode.

<<Negative Electrode>>

The negative active material for use in the negative electrode of the nonaqueous electrolyte secondary battery is not limited. The material in any form may be selected as long as the material is capable of occluding and releasing lithium ions. Examples thereof include titanium-based materials such as lithium titanate that has a spinel-type crystal structure as typified by $Li[Li_{1/3}Ti_{5/3}]O_4$, alloy materials such as Si, Sb, and Sn, lithium metals, lithium alloys (lithium metal-containing alloys such as lithium-silicon, lithium-aluminum, lithium-lead, lithium-tin, lithium-aluminum-tin, lithium-gallium, and wood alloys), lithium composite oxides (lithium-titanium), silicon oxides, and additionally, alloys capable of occluding and releasing lithium, and carbon materials (e.g., graphite, hard carbon, low-temperature calcined carbon, amorphous carbon).

The negative active material is used as a powder similarly to the positive active material, and the negative electrode may contain other components similarly to the positive electrode.

<<Preparation of Positive Electrode and Negative Electrode>>

The positive electrode and the negative electrode are suitably prepared in a manner such that after kneading the main component (each active material) and other materials to a composite and mixing the composite into an organic solvent such as N-methylpyrrolidone or toluene, or water, the mixed liquid obtained is applied or subjected to pressure bonding onto the current collector described below in detail, and then subjected to a heat treatment for about 2 hours at a temperature of about 50° C. to 250° C. For the method for the application, the liquid is preferably applied to have any thickness and any shape, for example, with the use of a means such as roller coating, e.g., an applicator roll, screen coating, a doctor blade method, spin coating, or a bar coater, but the method is not to be considered limited thereto.

As the current collector, current-collecting foil such as aluminum foil or copper foil can be used. Aluminum foil is preferable as the positive electrode current collector foil, and copper foil is preferable as the negative electrode current collector foil. The thickness of the current collector foil is preferably 10 μm or more and 30 μm or less. The thickness of the composite layer is preferably 40 μm or more and 150 μm or less (excluding the thickness of the current collector foil) after pressing.

<<Nonaqueous Electrolyte>>

The nonaqueous electrolyte for use in the nonaqueous electrolyte secondary battery according to yet another embodiment the present invention is not to be considered limited, and usable are electrolytes that are typically proposed for use in lithium batteries and the like.

Examples of the nonaqueous solvent for use in the nonaqueous electrolyte include cyclic carbonates such as a propylene carbonate, an ethylene carbonate, a butylene carbonate, and a chloroethylene carbonate, or fluorides thereof; cyclic esters such as γ-butyrolactone and γ-valerolactone; chain carbonates such as a dimethyl carbonate, a diethyl carbonate, and an ethyl methyl carbonate; chain esters such as a methyl formate, a methyl acetate, and a methyl butyrate; tetrahydrofuran or derivatives thereof; ethers such as 1,3-dioxane, 1,4-dioxane, 1,2-dimethoxyethane, 1,4-dibutoxyethane, and methyldiglyme; nitriles such as acetonitrile and benzonitrile; dioxolane or derivatives thereof; and ethylene sulfides or derivatives thereof, alone or as a mixture of two or more thereof.

Among these examples, in particular, a nonaqueous electrolyte in which the nonaqueous solvent including a fluorinated cyclic carbonate is preferably used. Examples of the fluorinated cyclic carbonate include 4-fluoroethylene carbonate, 4,4-difluoroethylene carbonate, 4,5-difluoroethylene carbonate, 4,4,5-trifluoroethylene carbonate, and 4,4,5,5-tetrafluoroethylene carbonate. Among them, 4-fluoroethylene carbonate (FEC) is preferably used in terms of the ability to suppress the battery swelling due to gas generation in the battery.

The content of the fluorinated cyclic carbonate is preferably 3% or higher and 30% or lower, and more preferably 5% or higher and 25% or lower in terms of volume ratio in the nonaqueous solvent.

<Method of Measuring Internal Resistance after Storage>

The use of a nonaqueous electrolyte including a fluorinated cyclic carbonate for the nonaqueous solvent allows the internal resistance after storage to be kept from being increased. In this specification, the internal resistance after storage is measured under the following conditions.

The completed battery is brought into the full charge state under conditions in normal use. Thereafter, the battery is left at 45° C. for 15 days, and then subjected to constant current discharge with a current of 0.2 C down to a voltage that is expected to be reached by the closed circuit voltage between terminals during normal use, and then left as an open circuit for 2 hours or more. The foregoing operation brings the nonaqueous electrolyte solution battery into a full discharge state. The resistance value between the positive and negative electrode terminals is measured at 25° C. with the use of an impedance meter configured to apply an alternating current (AC) of 1 kHz. Any overcharged nonaqueous electrolyte solution battery or overdischarged nonaqueous electrolyte solution battery is not allowed to be subjected to the measurement.

Additives typically for use in nonaqueous electrolyte solution secondary batteries may be added to the nonaqueous solvent according to the present embodiment without impairing the effects of the present invention. As the additives, for example, overcharge inhibitors, e.g., aromatic compounds such as biphenyl, alkylbiphenyl, terphenyl, partially hydrogenated terphenyl, cyclohexylbenzene, t-butylbenzene, t-amylbenzene, diphenyl ether, and dibenzofuran; partially fluorinated compounds of the above-mentioned aromatic compounds, such as 2-fluorobiphenyl, o-cyclohexylfluorobenzene, and p-cyclohexylfluorobenzene; fluorine-containing anisole compounds such as 2,4-difluoroanisole, 2,5-difluoroanisole, 2,6-difluoroanisole, and 3,5-difluoroanisole; negative electrode film forming agents such as vinylene carbonate, methyl vinylene carbonate, ethyl vinylene carbonate, succinic anhydride, glutaric anhydride, maleic anhydride, citraconic anhydride, glutaconic anhydride, itaconic anhydride, and cyclohexanedicarboxylic anhydride; ethylene sulfite, propylene sulfite, dimethyl sulfite, propane sultone, propene sultone, butane sultone, methyl methanesulfonate, busulfan, methyl toluene sulfonate, dimethyl sulfate, ethylene sulfate, sulfolane, dimethyl sulfone, diethyl sulfone, dimethylsulfoxide, diethylsulfoxide, tetramethylenesulfoxide, diphenyl sulfide, 4,4'-bis(2,2-dioxo-1,3,2-dioxathiolane, 4-methylsulfonyloxymethyl-2,2-dioxo-1,3,2-dioxathiolane, thioanisole, diphenyl disulfide, dipyridinium disulfide, perfluorooctane, tristrimethylsilyl borate, tristrimethylsilyl phosphate, tetrakistrimethylsilyl titanate, lithium monofluorophosphate, and lithium difluorophosphate can be added alone to the nonaqueous electrolyte, or two or more thereof can be added thereto in combination.

The proportions of these compounds contained in the nonaqueous electrolyte are not particularly limited, but are each, with respect to the whole nonaqueous solvent, preferably 0.01% by mass or higher, more preferably 0.1% by mass or higher, and further preferably 0.2% by mass or higher, and the upper limits thereof are preferably 5% by mass or lower, more preferably 3% by mass or lower, and further preferably 2% by mass or lower. Examples of the purpose of adding these compounds include the improved charge-discharge efficiency, suppressed increase in internal resistance, suppressed battery swelling, and the improved cycle performance.

Examples of the electrolyte salt for use in the nonaqueous electrolyte include inorganic ion salt containing one of lithium (Li), sodium (Na), or potassium (K), such as $LiClO_4$, $LiBF_4$, $LiAsF_6$, $LiPF_6$, LiSCN, LiBr, LiI, $Li_2SO_4$, $Li_2B_{10}Cl_{10}$, $NaClO_4$, NaI, NaSCN, NaBr, $KClO_4$, and KSCN, and organic ionic salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $C_2H_5)_4N$-phthalate, lithium stearyl sulfonate, lithium octyl sulfonate, and lithium dodecylbenzene sulfonate, and these ionic compounds can be used alone, or two or more thereof can be used in mixture.

Furthermore, the use of $LiPF_6$ or $LiBF_4$ and a lithium salt having a perfluoroalkyl group such as $LiN(C_2F_5SO_2)_2$ in mixture makes it possible to further decrease the viscosity of the electrolyte, thus allowing the low-temperature characteristics to be further improved, and allowing self discharge to be suppressed, which is more preferable.

Further, an ambient temperature molten salt or an ionic liquid may be used as the nonaqueous electrolyte.

The concentration of the electrolyte salt in the nonaqueous electrolyte is preferably 0.1 mol/L or more and 5 mol/L or less, further preferably 0.5 mol/L or more and 2.5 mol/L or less, for reliably obtaining a nonaqueous electrolyte battery with improved battery characteristics.

<<Separator>>

As the separator for the nonaqueous electrolyte secondary battery, porous membranes, nonwoven fabrics, and the like that show excellent high rate discharge performance are preferably used either alone or in combination. Examples of the material constituting the separator for the nonaqueous electrolyte battery include polyolefin-based resins typified by polyethylene and polypropylene, polyester-based resins typified by polyethylene terephthalate and polybutylene terephthalate, polyvinylidene fluoride, vinylidene fluoride-hexafluoropropylene copolymers, vinylidene fluoride-perfluorovinyl ether copolymers, vinylidene fluoride-tetrafluoroethylene copolymers, vinylidene fluoride-trifluoroethylene copolymers, vinylidene fluoride-fluoroethylene copolymers, vinylidene fluoride-hexafluoroacetone copolymers, vinylidene fluoride-ethylene copolymers, vinylidene fluoride-propylene copolymers, vinylidene fluoride-trifluoropropylene copolymers, vinylidene fluoride-tetrafluoroethylene-hexafluoropropylene copolymers, and vinylidene fluoride-ethylene-tetrafluoroethylene copolymers.

From the viewpoint of strength, the porosity of the separator is preferably 98% by volume or lower. In addition, from the viewpoint of charge-discharge characteristics, the porosity is preferably 20% by volume or higher.

In addition, for example, a polymer gel composed of a polymer such as acrylonitrile, ethylene oxide, propylene oxide, methyl methacrylate, vinyl acetate, vinylpyrrolidone, or polyvinylidene fluoride and an electrolyte may be used for the separator. The use of the nonaqueous electrolyte in the gel state as mentioned above is preferable in terms of the effect of preventing liquid leakage.

Furthermore, for the separator, the use of the porous membrane, non-woven fabric, or the like as described above in combination with the polymer gel is preferable because the liquid retention of the electrolyte is improved. More specifically, a film coated with a solvophilic polymer of several μm or less in thickness is formed on the surface of the polyethylene microporous membrane and the micropore wall surface, and the electrolyte is held in the micropores of the film, thereby gelling the hydrophilic solvent.

Examples of the solvophilic polymer include polyvinylidene fluoride, as well as polymers obtained by crosslinking an acrylate monomer having an ethylene oxide group or an ester group, an epoxy monomer, a monomer having an isocyanate group, or the like. The monomer can be subjected to a crosslinking reaction by electron beam (EB) irradiation, or heating with the addition of a radical initiator, or by ultraviolet (UV) irradiation or the like.

<<Configuration of Nonaqueous Electrolyte Secondary Battery>>

The configuration of the nonaqueous electrolyte secondary battery according to yet another embodiment of the present invention is not to be considered particularly limited, and examples thereof include a cylindrical battery including a positive electrode, a negative electrode, and a roll-shaped separator, a prismatic battery (rectangular battery), and a flattened battery.

Figure 7:
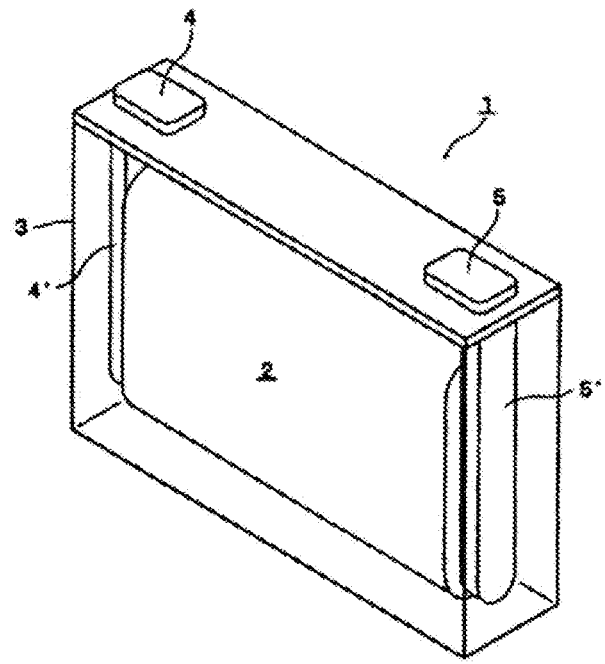
FIG. 7 is an external perspective view illustrating an embodiment of a nonaqueous electrolyte secondary battery according to the present invention.

FIG. 7 shows an external perspective view of a rectangular nonaqueous electrolyte secondary battery 1 according to an embodiment of the present invention. It is to be noted that the figure is a diagram of the inside seen through a case. The nonaqueous electrolyte secondary battery 1 shown in FIG. 7 has an electrode group 2 housed in a battery case 3. The electrode group 2 is formed by winding a positive electrode including a positive active material and a negative electrode including a negative active material with a separator interposed therebetween. The positive electrode is electrically connected to a positive electrode terminal 4 through a positive electrode lead 4', and the negative electrode is electrically connected to a negative electrode terminal 5 through a negative electrode lead 5'.

<<Configuration of Energy Storage Apparatus>>

Figure 8:
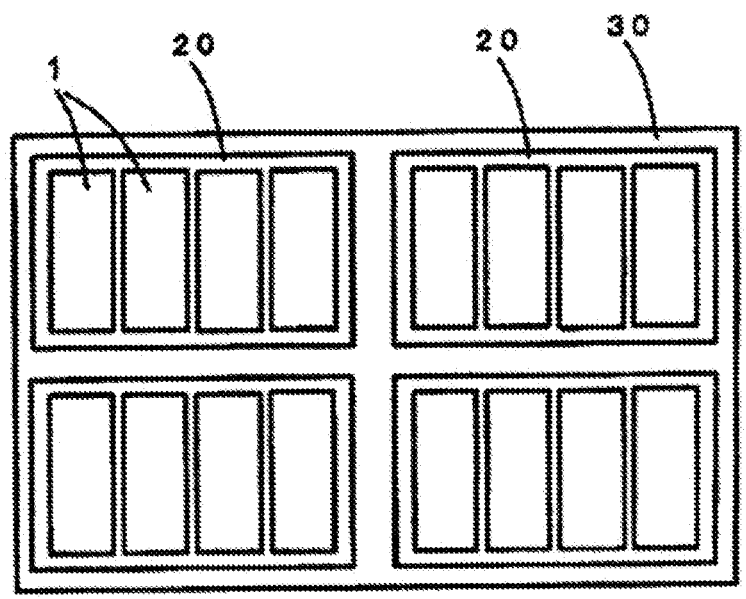
FIG. 8 is a schematic diagram illustrating an energy storage apparatus including a plurality of nonaqueous electrolyte secondary batteries according to the present invention.

An energy storage apparatus in which the above-mentioned multiple nonaqueous electrolyte secondary batteries are assembled is also included in the embodiment of the present invention. The energy storage apparatus 30 shown in FIG. 8 includes a plurality of energy storage units 20. Each of the energy storage units 20 includes a plurality of nonaqueous electrolyte secondary batteries 1. The energy storage apparatus 30 can be mounted as a power source for vehicles such as electric vehicles (EV), hybrid vehicles (HEV), and plug-in hybrid vehicles (PHEV).

<Method for Manufacturing Nonaqueous Electrolyte Secondary Battery, and Method of Using Battery>

Yet another embodiment of the present invention is a method for manufacturing a nonaqueous electrolyte secondary battery, including: assembling a nonaqueous electrolyte secondary battery with the use of the positive electrode for a nonaqueous electrolyte secondary battery; and subjecting the battery to initial charge-discharge, in which the positive electrode in the initial charge-discharge step has a maximum attainable potential of higher than 4.3 V (vs. Li/Li$^+$) and lower than 4.5 V (vs. Li/Li$^+$).

Furthermore, yet another embodiment of the present invention is a method of using the nonaqueous electrolyte secondary battery, for use at a battery voltage at which the positive electrode has a maximum attainable potential of higher than 4.3 V (vs. Li/Li$^+$) and lower than 4.5 V (vs. Li/Li$^+$) in a full charge state (SOC 100%).

More specifically, the nonaqueous electrolyte secondary battery according to yet another embodiment of the present invention is assumed to be manufactured without undergoing any charge process until the completion of the above-mentioned region with flat potential change, and used without undergoing any charge with electricity until the completion of the region with flat potential change. The charge voltages in the charge process during the manufacture and in use are preferably set such that the potential reached by the positive electrode through the charge, that is, the charge upper limit potential, is equal to or lower than the potential at which the region with flat potential change starts. The charge upper limit potential can be, for example, 4.40 V (vs. Li/Li$^+$). The charge upper limit potential may be 4.38 V (vs. Li/Li$^+$), 4.36 V (vs. Li/Li$^+$), 4.34 V (vs. Li/Li$^+$), or 4.32 V (vs. Li/Li$^+$).

EXAMPLES

Experimental Example 1

Experimental Example 1 has examples and comparative examples corresponding to the positive active material for a nonaqueous electrolyte secondary battery according to an embodiment of the present invention.

Presented first are examples of varying conditions for producing lithium-transition metal composite oxides of the same composition.

<Preparation of Positive Active Material (Lithium-Transition Metal Composite Oxide)>

Example 1-1

For preparing an active material according to the example, a transition metal hydroxide precursor was prepared by using a reaction crystallization method. First, a nickel sulfate hexahydrate, a cobalt sulfate heptahydrate, and a manganese sulfate pentahydrate were weighed respectively to 315.4 g, 168.6 g, and 530.4 g, and the total of these hydrates was dissolved in 4 L of ion-exchange water to prepare a 1.0 M aqueous solution of sulfates with a molar ratio Ni:Co:Mn of 30:15:55. Next, 2 L of ion-exchange water was poured into a 5 L reaction tank, and bubbled with an N$_2$ gas for 30 minutes to remove oxygen contained in the ion-exchange water. The temperature of the reaction tank was set to 50° C. (±2° C.), such that sufficient convection in the reaction tank was generated, while stirring the inside of the reaction tank at a rotation speed of 1500 rpm with the use of a paddle blade equipped with a stirring motor. The undiluted sulfate solution was delivered by drops to the reaction tank at a rate of 1.3 mL/min for 50 hours. In this regard, between the start of the dropping and the end thereof, a mixed alkaline solution composed of a 4.0 M sodium hydroxide, a 1.25 M ammonia, and a 0.1 M hydrazine was appropriately delivered by drops, thereby controlling the pH in the reaction tank to be always kept at 9.8 (±0.1), and the reaction liquid was partially discharged by overflow thereof, thereby controlling the total amount of the reaction liquid always not to exceed 2 L. After the completion of the dropping, stirring in the reaction tank was continued for another 1 hour. After stopping the stirring, the reaction tank was left at room temperature for 12 hours or longer.

Next, the hydroxide precursor particles produced in the reaction tank were separated with the use of a suction filtration device, sodium ions adhering to the particles were further washed away with the use of ion-exchange water, and with the use of an electric furnace, the particles were dried in an air atmosphere at 80° C. for 20 hours under ordinary pressure. Then, the powder was crushed for several minutes in an automatic agate mortar to make the particle sizes uniform. In this manner, the transition metal hydroxide precursor was prepared.

To 2.262 g of the transition metal hydroxide precursor, 1.294 g of a lithium hydroxide monohydrate was added, and mixed well with the use of an automatic agate mortar to prepare a mixed powder with the molar ratio Li:(Ni, Co, Mn) of 120:100. With the use of a pellet molding machine, the powder was subjected to molding at a pressure of 13.5 MPa to obtain pellets of 25 mm in diameter. The amount of the mixed powder subjected to the pellet molding was determined by converting the amount such that the assumed mass of the final product was 2.5 g. One of the pellets was placed on an alumina boat with a total length of about 100 mm, and the boat was placed in a box-type electric furnace (model number: AMF20), and subjected to a temperature increase from ordinary temperature to 800° C. over 10 hours, and then to firing at 800° C. for 4 hours, under ordinary pressure in an air atmosphere. The internal dimensions of the box-type electric furnace are 10 cm in length, 20 cm in width, and 30 cm in depth, with heating wires inserted at intervals of 20 cm in the width direction. After the firing, the heater was turned off, and the alumina boat was naturally cooled with the boat left in the furnace. As a result, the furnace temperature drops to about 200° C. after 5 hours, but the rate of the subsequent temperature decrease is rather slow. After all night and all day, the pellet was taken out after confirming that the temperature of the furnace was 100° C. or lower, and crushed for a few minutes in an agate automatic mortar to make the particle sizes uniform. In this manner, a lithium-transition metal composite oxide Li$_{1.09}$Ni$_{0.27}$Co$_{0.14}$Mn$_{0.50}$O$_2$ according to Example 1-1 was prepared.

Examples 1-2 to 1-5

Similarly to Example 1-1 except that the mixed powder of the transition metal hydroxide precursor and the lithium hydroxide monohydrate was respectively subjected to firing at 850° C., 900° C., 1000° C., and 750° C., lithium-transition metal composite oxides according to Examples 1-2 to 1-5 were prepared.

Examples 1-6 and 1-7

Similarly to Example 1-1 except that the pH in the reaction tank was adjusted to 10.0 and 10.2 in the preparation of the transition metal hydroxide precursor, lithium-transition metal composite oxides according to Examples 1-6 and 1-7 were prepared.

Examples 1-8 and 1-9

Similarly to Example 1-1 except that the mixed powder of the transition metal hydroxide precursor and the lithium hydroxide monohydrate was subjected respectively to firing at 700° C. and 650° C., lithium-transition metal composite oxides according to Examples 1-8 and 1-9 were prepared.

Examples 1-10 to 1-13

Similarly to Example 1-1 except that the pH in the reaction tank was adjusted to 10.5, 10.7, and 9.0 in the preparation of the transition metal hydroxide precursor, lithium-transition metal composite oxides according to Examples 1-10 to 1-12 were prepared.
Furthermore, similarly to Example 1-9 except that the pH in the reaction tank was adjusted to 11.0, a lithium-transition metal composite oxide according to Example 1-13 was prepared.
Next, examples and comparative examples of varying the composition of the lithium-transition metal composite oxide and/or the conditions for producing the oxide are presented below.

Example 1-14

Similarly to Example 1-1 except for preparing the transition metal hydroxide precursor such that the composition thereof met a molar ratio Ni Co:Mn of 40:5:55 and preparing the mixed powder of the transition metal hydroxide precursor and the lithium compound such that the molar ratio Li:(Ni, Co, Mn) thereof met 110:100, a lithium-transition metal composite oxide according to Example 1-14 was prepared.

Example 1-15

Similarly to Example 1-1 except for preparing the transition metal hydroxide precursor such that the composition thereof met a molar ratio Ni Co:Mn of 45:5:50, adjusting the pH in the reaction tank to 10.0 in the preparation of the transition metal hydroxide precursor, preparing the mixed powder of the transition metal hydroxide precursor and the lithium compound such that the molar ratio Li:(Ni, Co, Mn) thereof met 110:100, and firing the powder at 850° C., a lithium-transition metal composite oxide according to Example 1-15 was prepared.

Examples 1-16 to 1-29

Similarly to Example 1-1 except that the molar ratio Ni:Co:Mn of the transition metal hydroxide precursor, the molar ratio Li/Me of the lithium compound to the transition metal of the precursor, the pH of the reaction tank, and the firing temperature for the precursor and the lithium compound met the conditions shown in Table 1 below, lithium-transition metal composite oxides according to Example 1-16 to 1-29 were prepared.

Comparative Examples 1-1 and 1-2

Similarly to Example 1-1 except for preparing the transition metal hydroxide precursor such that the composition thereof met a molar ratio Ni:Co:Mn of 30:10:60, preparing the precursor at pH of 9.6 in the reaction tank, with the concentrations of ammonia and hydrazine delivered by drops into the reaction tank being respectively adjusted to 0.6 M and 0.3 M, preparing the molar ratio Li/Me of the lithium compound to the transition metal of the precursor to reach 1.3, and firing at the firing temperature shown in Table 1 below, lithium-transition metal composite oxides according to Comparative Examples 1-1 and 1-2 were prepared.

Comparative Example 1-3

Similarly to Example 1-1 except for preparing the mixed powder of the transition metal hydroxide precursor and the lithium compound such that the molar ratio Li/Me of Li:Me was 1.0, a lithium-transition metal composite oxide according to Comparative Example 1-3 was prepared.

Comparative Examples 1-4 and 1-5

Similarly to Example 1-1 except for preparing the transition metal hydroxide precursor such that the composition thereof met a molar ratio NiCo:Mn of 33:33:33 (1:1:1), adjusting the pH in the reaction tank to 10.0, adjusting the molar ratio Li/Me of the lithium compound to the transition metal hydroxide precursor to 1.0 or 1.1, and firing the powder at 900° C., lithium-transition metal composite oxides according to Comparative Examples 1-4 and 1-5 were prepared.

<Confirmation of Crystal Phase of Precursor>

In order to confirm the crystal phases of the transition metal hydroxide precursors prepared in the examples and comparative examples mentioned above, an X-ray diffractometer (from Rigaku, model name: MiniFlex II) was used to perform measurements in accordance with the approach of the X-ray diffraction measurement.

As a reference, the result of X-ray diffraction measurement for the precursors is shown in FIG. 6 In the case of Example 1-13 synthesized with the pH in the reaction tank being 11.0, diffraction lines derived from the ßNi(OH)$_2$-type crystal structure were observed. In the case of Example 1-12 synthesized with the pH in the reaction tank being 9.0, diffraction lines derived from the αNi(OH)$_2$-type crystal structure were observed. In contrast, in Example 1-1 synthesized with the pH in the reaction tank being 9.8, a mixed phase of the αNi(OH)$_2$-type crystal structure and the ßNi (OH)$_2$-type crystal structure was observed. The αNi(OH)$_2$-type crystal structure has the largest peak at 2θ=10° or more and 12° or less, and the ßNi(OH)$_2$-type crystal structure has the largest peak at 2θ=18° or more and 20° or less.

<Calculation of Peak Intensity Ratio>

Calculated was $I_{11}/I_{19}$ with the maximum value of the peak intensity at 2θ=10° or more and 12° or less as the numerator and the maximum value of the peak intensity at 2θ=18° or more and 20° or less as the denominator. More specifically, the $I_{11}/I_{19}$ can be considered as an index indicating how much the α type and the ß type are present. In this regard, the results are each subjected to background processing with accessory software.

<Confirmation of Crystal Structure and Half Width of Lithium-Transition Metal Composite Oxide>

The half widths of the lithium-transition metal composite oxides according to the examples and comparative examples mentioned above were measured in accordance with the conditions and procedures described above. In each case, having the α-NaFeO$_2$-type crystal structures was confirmed by the fact that the diffraction patterns agreed with the structural model in X-ray diffraction measurement. Further, the accessory software "PDXL" of the X-ray diffractometer was used to determine the half width FWHM (104) for the diffraction peak at 2θ=44±1° on the X-ray diffraction pattern, indexed to the (104) plane in the space group R3-m.

In the case of Examples 1-1 to 1-29 and Comparative Examples 1-1 and 1-2, the superlattice peak specific to the lithium-excessive positive active material was observed in the range of 2θ=20° or more and 22° or less.

<Measurement of Tap Density and Press Density>

The tap densities and press densities of the lithium-transition metal composite oxides according to the examples and comparative examples mentioned above were measured in accordance with the conditions and procedures described above.

<Preparation of Positive Electrode for Nonaqueous Electrolyte Secondary Battery>

With the use of, for the positive active material, the lithium-transition metal composite oxides according to the examples and comparative examples mentioned above, positive electrodes for nonaqueous electrolyte secondary batteries according to the examples and comparative examples were prepared in accordance with the following procedure.

With N-methylpyrrolidone as a dispersion medium, a paste for application was prepared in which the positive active material, acetylene black (AB), and polyvinylidene fluoride (PVdF) were mixed and dispersed in proportions of 90:5:5. The paste for application was applied on one surface of an aluminum foil current collector with a thickness of 20 μm, dried and then pressed to prepare a positive electrode plate. It is to be noted that the mass of the active material applied per specific area and the porosity after pressing were adjusted to be comparable in all of the examples and comparative examples.

<Preparation of Nonaqueous Electrolyte Secondary Battery>

With the partially cut positive electrode for a nonaqueous electrolyte secondary battery, prepared in the manner mentioned above, a test battery as a nonaqueous electrolyte secondary battery was prepared in accordance with the following procedure.

For the purpose of accurately observing the independent behavior of the positive electrode, metallic lithium was used in close contact with the nickel foil current collector for the counter electrode, that is, the negative electrode. In this regard, a sufficient amount of metallic lithium was disposed for the negative electrode such that the capacity of the nonaqueous electrolyte secondary battery was not limited by the negative electrode.

A solution in which LiPF$_6$ was dissolved to a concentration of 1 mol/L in a mixed solvent of ethylene carbonate (EC)/ethyl methyl carbonate (EMC)/dimethyl carbonate (DMC) with a volume ratio of 6:7:7 was used as a nonaqueous electrolyte. As the separator, a polypropylene microporous membrane surface-modified with polyacrylate was used. A metal-resin composite film composed of polyethylene terephthalate (15 μm)/aluminum foil (50 μm)/metal-adhesive polypropylene film (50 μm) was used for the outer case. The electrodes were housed such that the open ends of the positive electrode terminal and negative electrode terminal were exposed to the outside, the sealing body with inner surfaces of the metal-resin composite film being opposed to each other was hermetically sealed, except for a part for an injection hole, and after nonaqueous electrolyte solution filling, the injection hole was sealed.

The counter electrode is metallic lithium, and the battery voltage (V) can be thus read directly as a positive electrode potential (V. vs Li/Li$^+$).

<Initial Charge-Discharge Step>

The nonaqueous electrolyte secondary batteries assembled in accordance with the above-mentioned procedure is finished through the initial charge-discharge step. In this regard, the initial charge-discharge step was divided into a first group to which an initial charge-discharge condition 1 is applied and a second group to which an initial charge-discharge condition 2 is applied.

(Initial Charge-Discharge Condition 1)

The batteries in the first group were used for the initial charge-discharge step under the following condition applied. Under an environment at 25° C., the charge was constant current constant voltage charge with a current of 0.1 C and a voltage of 4.35 V, and the charge cutoff condition was the time when the current value was attenuated to 0.02 C. The discharge was constant current discharge with a current of 0.1 C and a cutoff voltage of 2.5 V. This charge-discharge was performed for 1 cycle. Further, a pause process for 10 minutes was provided after the charge.

The amount of charge and the discharge capacity in this case were respectively recorded as "the amount of charge during 4.35 V charge" and "the discharge capacity during 4.35 V charge". More specifically, "the discharge capacity during 4.35 V charge" refers to an index indicating the discharge capacity in the case of manufacture without undergoing any charge process until the completion of the region with flat potential change, and use in a lower potential range without undergoing any charge with electricity until the completion of the region with flat potential change.

(Initial Charge-Discharge Condition 2)

The batteries in the second group were used for the initial charge-discharge step under the following condition applied. Under an environment at 25° C., the charge was constant current constant voltage charge with a current of 0.1 C and a voltage of 4.6 V, and the charge cutoff condition was the time when the current value was attenuated to 0.02 C. The discharge was constant current discharge with a current of 0.1 C and a cutoff voltage of 2.0 V. This charge-discharge was performed for 1 cycle. Further, a pause process for 10 minutes was provided after the charge.

The difference between the amount of charge in this case and "the amount of charge during 4.35 V charge" was calculated as "the amount of charge between 4.35 and 4.6 V". More specifically, "the amount of charge between 4.35 and 4.6 V" refers to an index indicating the amount of charge in the region with flat potential change.

<Overcharge Test>

With the use of the nonaqueous electrolyte secondary batteries according to the examples and comparative examples mentioned above, constant current (CC) charge was performed at a current value of 10 mA per 1 g of the positive composite without setting the upper limit of the voltage. In this regard, the ratio of the capacity Y (mAh) at each voltage to the capacity X (mAh) at the time of reaching 4.45 V from the start of the charge was denoted by Z (=Y/X*100(%)), and the capacity ratio Z (%) obtained when the positive electrode potential rose suddenly to cause the voltage to reach 5.1 V was recorded as a "retardation effect". In addition, the maximum value of dZ/dV was obtained.

The above results are shown in Tables 1 and 2.

TABLE 1

| | Transition metal composition Ni/Co/Mn [mol %] | Ratio Li/Me [Molar ratio] | Firing temperature ° C. | pH in reaction layer | Discharge capacity during 4.35 V charge [mAh/g] | Amount of charge between 4.35 and 4.6 V [mAh/g] | dZ/dVmax |
|---|---|---|---|---|---|---|---|
| Example 1-1 | 30/15/55 | 1.2 | 800 | 9.8 | 137 | 115 | 450 |
| Example 1-2 | 30/15/55 | 1.2 | 850 | 9.8 | 138 | 112 | 460 |
| Example 1-3 | 30/15/55 | 1.2 | 900 | 9.8 | 136 | 108 | 470 |
| Example 1-4 | 30/15/55 | 1.2 | 1000 | 9.8 | 133 | 104 | 490 |
| Example 1-5 | 30/15/55 | 1.2 | 750 | 9.8 | 137 | 126 | 440 |
| Example 1-6 | 30/16/55 | 1.2 | 800 | 10.0 | 136 | 118 | 450 |
| Example 1-7 | 30/15/55 | 1.2 | 800 | 10.2 | 134 | 116 | 450 |
| Example 1-8 | 30/15/55 | 1.2 | 700 | 9.8 | 128 | 138 | 440 |
| Example 1-9 | 30/15/55 | 1.2 | 650 | 9.8 | 127 | 139 | 435 |
| Example 1-10 | 30/15/55 | 1.2 | 800 | 10.5 | 126 | 136 | 450 |
| Example 1-11 | 30/15/55 | 1.2 | 800 | 10.7 | 122 | 125 | 450 |
| Example 1-12 | 30/15/55 | 1.2 | 800 | 9.0 | 129 | 109 | 450 |
| Example 1-13 | 30/16/55 | 1.2 | 650 | 11.0 | 126 | 188 | 430 |
| Example 1-14 | 40/5/55 | 1.1 | 800 | 9.8 | 148 | 91 | 330 |
| Example 1-15 | 45/5/50 | 1.1 | 850 | 10.0 | 149 | 90 | 320 |
| Example 1-16 | 50/5/45 | 1.2 | 900 | 10.0 | 142 | 96 | 350 |
| Example 1-17 | 55/5/40 | 1.3 | 850 | 10.0 | 141 | 118 | 440 |
| Example 1-18 | 45/0/55 | 1.3 | 900 | 10.0 | 132 | 129 | 510 |
| Example 1-19 | 55/0/45 | 1.3 | 900 | 10.0 | 158 | 100 | 430 |
| Example 1-20 | 60/0/40 | 1.3 | 900 | 10.0 | 162 | 91 | 420 |
| Example 1-21 | 35/15/50 | 1.3 | 800 | 10.0 | 140 | 152 | 430 |
| Example 1-22 | 40/15/45 | 1.3 | 800 | 10.0 | 146 | 125 | 420 |
| Example 1-23 | 45/15/40 | 1.2 | 800 | 10.0 | 160 | 110 | 400 |
| Example 1-24 | 45/16/40 | 1.3 | 800 | 10.0 | 140 | 147 | 430 |
| Example 1-25 | 45/15/40 | 1.2 | 850 | 10.0 | 159 | 106 | 420 |
| Example 1-26 | 45/15/40 | 1.2 | 900 | 10.0 | 164 | 100 | 480 |
| Example 1-27 | 35/25/40 | 1.2 | 850 | 10.0 | 156 | 107 | 420 |
| Example 1-28 | 25/35/40 | 1.2 | 900 | 10.0 | 151 | 108 | 430 |
| Example 1-29 | 40/5/55 | 1.2 | 800 | 9.8 | 132 | 118 | 450 |
| Comparative Example 1-1 | 30/10/60 | 1.3 | 800 | 9.6 | 111 | 169 | 520 |
| Comparative Example 1-2 | 30/10/60 | 1.3 | 650 | 9.6 | 102 | 134 | 460 |
| Comparative Example 1-3 | 30/15/55 | 1.0 | 800 | 9.8 | 86 | 139 | 120 |
| Comparative Example 1-4 | 30/33/33 | 1.0 | 900 | 10.0 | 172 | 22 | 90 |
| Comparative Example 1-5 | 30/33/33 | 1.1 | 900 | 10.0 | 165 | 54 | 120 |

TABLE 2

| | Transition metal composition Ni/Co/Mn [mol %] | Ratio Li/Me [Molar ratio] | Crystal phase of precursor | $I_{11}/I_{13}$ | TAP density [g/cm$^3$] | Press density [g/cm$^3$] | FWHM(104) [°] |
|---|---|---|---|---|---|---|---|
| Example 1-1 | 30/16/55 | 1.2 | αMe(OH)$_2$ + βMe(OH)$_2$ | 0.32 | 2.04 | 2.91 | 0.466 |
| Example 1-2 | 30/15/55 | 1.2 | αMe(OH)$_2$ + βMe(OH)$_2$ | 0.32 | 2.06 | 2.92 | 0.413 |
| Example 1-3 | 30/15/55 | 1.2 | αMe(OH)$_2$ + βMe(OH)$_2$ | 0.32 | 2.04 | 2.92 | 0.365 |
| Example 1-4 | 30/15/55 | 1.2 | αMe(OH)$_2$ + βMe(OH)$_2$ | 0.32 | 1.94 | 3.13 | 0.229 |
| Example 1-5 | 30/16/55 | 1.2 | αMe(OH)$_2$ + βMe(OH)$_2$ | 0.32 | 1.95 | 2.88 | 0.517 |
| Example 1-6 | 30/15/55 | 1.2 | αMe(OH)$_2$ + βMe(OH)$_2$ | 0.05 | 1.82 | 2.85 | 0.442 |
| Example 1-7 | 30/15/55 | 1.2 | αMe(OH)$_2$ + βMe(OH)$_2$ | 0.03 | 1.82 | 2.87 | 0.414 |
| Example 1-8 | 30/15/55 | 1.2 | αMe(OH)$_2$ + βMe(OH)$_2$ | 0.32 | 2.06 | 2.85 | 0.602 |
| Example 1-9 | 30/16/55 | 1.2 | αMe(OH)$_2$ + βMe(OH)$_2$ | 0.32 | 2.06 | 2.82 | 0.669 |
| Example 1-10 | 30/15/55 | 1.2 | βMe(OH)$_2$ | 0.01 | 1.31 | 2.63 | 0.448 |
| Example 1-11 | 30/15/55 | 1.2 | βMe(OH)$_2$ | 0.01 | 1.08 | 2.50 | 0.434 |
| Example 1-12 | 30/15/55 | 1.2 | αMe(OH)$_2$ | 21.33 | 1.22 | 2.41 | 0.442 |
| Example 1-13 | 30/15/55 | 1.2 | βMe(OH)$_2$ | 0.01 | 1.13 | 2.38 | 0.606 |
| Example 1-14 | 40/5/55 | 1.1 | αMe(OH)$_2$ + βMe(OH)$_2$ | 0.44 | 1.88 | 2.80 | 0.524 |
| Example 1-15 | 45/5/50 | 1.1 | αMe(OH)$_2$ + βMe(OH)$_2$ | 0.05 | 1.66 | 2.88 | 0.501 |
| Example 1-16 | 50/5/45 | 1.2 | αMe(OH)$_2$ + βMe(OH)$_2$ | 0.05 | 2.04 | 2.83 | 0.289 |
| Example 1-17 | 55/5/40 | 1.3 | αMe(OH)$_2$ + βMe(OH)$_2$ | 0.07 | 2.02 | 2.85 | 0.238 |
| Example 1-18 | 45/0/58 | 1.3 | αMe(OH)$_2$ + βMe(OH)$_2$ | 0.05 | 2.10 | 3.12 | 0.397 |
| Example 1-19 | 55/0/45 | 1.3 | αMe(OH)$_2$ + βMe(OH)$_2$ | 0.07 | 1.86 | 3.13 | 0.223 |
| Example 1-20 | 60/0/40 | 1.3 | αMe(OH)$_2$ + βMe(OH)$_2$ | 0.12 | 2.03 | 3.19 | 0.220 |
| Example 1-21 | 35/15/50 | 1.3 | αMe(OH)$_2$ + βMe(OH)$_2$ | 0.06 | 1.71 | 2.83 | 0.421 |

TABLE 2-continued

| | Transition metal composition Ni/Co/Mn [mol %] | Ratio Li/Me [Molar ratio] | Crystal phase of precursor | $I_{11}/I_{13}$ | TAP density [g/cm$^3$] | Press density [g/cm$^3$] | FWHM(104) [°] |
|---|---|---|---|---|---|---|---|
| Example 1-22 | 40/15/45 | 1.3 | αMe(OH)$_2$ + βMe(OH)$_2$ | 0.11 | 1.77 | 2.82 | 0.359 |
| Example 1-23 | 45/15/40 | 1.2 | αMe(OH)$_2$ + βMe(OH)$_2$ | 0.08 | 1.80 | 2.82 | 0.334 |
| Example 1-24 | 45/15/40 | 1.3 | αMe(OH)$_2$ + βMe(OH)$_2$ | 0.08 | 1.78 | 2.88 | 0.280 |
| Example 1-25 | 45/15/40 | 1.2 | αMe(OH)$_2$ + βMe(OH)$_2$ | 0.08 | 1.70 | 2.83 | 0.277 |
| Example 1-26 | 45/15/40 | 1.2 | αMe(OH)$_2$ + βMe(OH)$_2$ | 0.08 | 1.70 | 2.83 | 0.236 |
| Example 1-27 | 35/26/40 | 1.2 | αMe(OH)$_2$ + βMe(OH)$_2$ | 0.11 | 2.05 | 3.13 | 0.383 |
| Example 1-28 | 25/35/40 | 1.2 | αMe(OH)$_2$ + βMe(OH)$_2$ | 0.04 | 1.90 | 3.17 | 0.282 |
| Example 1-29 | 40/5/55 | 1.2 | αMe(OH)$_2$ + βMe(OH)$_2$ | 0.44 | 1.86 | 2.84 | 0.541 |
| Comparative Example 1-1 | 30/10/60 | 1.3 | αMe(OH)$_2$ + βMe(OH)$_2$ | 0.08 | 2.12 | 2.96 | 0.467 |
| Comparative Example 1-2 | 30/10/60 | 1.3 | αMe(OH)$_2$ + βMe(OH)$_2$ | 0.08 | 2.26 | 2.87 | 0.737 |
| Comparative Example 1-3 | 30/15/55 | 1.0 | αMe(OH)$_2$ + βMe(OH)$_2$ | 0.32 | 1.83 | 2.83 | 0.502 |
| Comparative Example 1-4 | 30/33/33 | 1.0 | αMe(OH)$_2$ + βMe(OH)$_2$ | 0.08 | 2.38 | 3.13 | 0.157 |
| Comparative Example 1-5 | 30/33/33 | 1.1 | αMe(OH)$_2$ + βMe(OH)$_2$ | 0.08 | 2.26 | 3.21 | 0.158 |

The positive active materials according to Examples 1-1 to 1-13, shown in Table 1 and Table 2, all have the same composition. Further, the same reaction pH in the preparation of the transition metal hydroxide precursor is 9.8, and the precursor contains α-type and β-type crystal phases.

In Examples 1-1 to 1-13, the compositions of the lithium-transition metal composite oxides satisfy the compositional range according to an embodiment of the present invention, and thus, nonaqueous electrolyte secondary batteries have been achieved in which "the discharge capacity during 4.35 V charge" is 120 mAh/g or more, "the amount of charge between 4.35 and 4.6 V" is as large as 100 mAh/g or more, and dZ/dV has a maximum value of 150 or more within the positive electrode potential range of 4.35 V (vs. Li/Li$^+$) or higher and 4.6 V (vs. Li/Li$^+$) or lower.

Accordingly, the positive active materials can be considered as positive active materials for nonaqueous electrolyte secondary batteries in which the discharge capacity is high even in the case of charge with electricity at a relatively low voltage, and in which no sudden increase in battery voltage is observed up to reaching a higher SOC.

In addition, the FWHM (104) of the lithium-transition metal composite oxide falls within the range of 0.2° or more and 0.6° or less in Examples 1-1 to 1-5 of firing the precursor and the lithium compound at 750° C. or higher and 1000° C. or lower, whereas the lithium-transition metal composite oxides with the FWHM (104) in excess of 0.6° are achieved in Examples 1-8 and 1-9 with the firing temperature of lower than 750° C. Furthermore, it is determined that Examples 1-1 to 1-5 with the firing temperature of 750° C. or higher and 1000° C. or lower are higher in "the discharge capacity during 4.35 V charge" than Examples 1-8 and 1-9.

Examples 1-6 and 1-7 and Examples 1-10 to 1-12 are examples of adjusting the pH in the reaction tank respectively to 10.0, 10.2, 10.5, 10.7, and 9.0 with respect to 9.8 of Example 1-1 in the preparation of the transition metal hydroxide precursor, and Example 1-13 is an example of adjusting the pH in the reaction tank to 11.0 and also adjusting the firing temperature to 650° C. In Examples 1-6 and 1-7 with the pH in the reaction tank adjusted to 10.2 or less, the precursors contain α-type and β-type crystal phases, and the lithium-transition metal composite oxides prepared with the use of the precursors have press densities in excess of 2.7 g/cm$^3$.

In contrast, the precursors according to Examples 1-10, 1-11, and 1-13 with the pH in the reaction tank in excess of 10.2 have a β-type single phase, and the precursor has an α-type single phase in Example 1-12 with the pH of 9.0 in the reaction tank. The lithium-transition metal composite oxides prepared with the use of the single-phase precursors according to Examples 1-10 to 1-13 never exceed 2.7 g/cm$^3$ in press density, even in the case of the firing temperature adjusted to 800° C.

In addition, in Examples 1-13, the degree of crystallization is low because of the low firing temperature and the large FWHM (104) in excess of 0.6°.

Further, it is determined that Examples 1-1 to 1-7 are higher in "the discharge capacity during 4.35 V charge" than Examples 1-10 to 1-13.

According to Examples 1-14 to 1-29, it is determined that the batteries with the lithium-transition metal composite oxides for the positive active material each have a high "discharge capacity during 4.35 V charge" and a large "amount of charge between 4.35 and 4.6 V", the lithium-transition metal composite oxides each obtained by preparing the transition metal hydroxide precursor such that the composition thereof has a molar ratio Mn/Me that meets 0.4≤Mn/Me<0.6 and 0.2<Ni/Me≤0.6, preparing a hydroxide precursor containing αMn(OH)$_2$ and βMn(OH)$_2$ with the pH in the reaction tank adjusted to 10.2 or less in the preparation of the transition metal hydroxide precursor, mixing this precursor and a lithium compound such that the molar ratio Li/Me of Li to Me is 1.05 or more, and firing the mixture at a temperature of 1000° C. or lower. It is to be noted that the above-mentioned lithium-transition metal composite oxides were 2.7 g/cm$^3$ or more in press density, with the FWHM (104) within the rage of 0.2° or more and 0.6° or less.

In the lithium-transition metal composite oxides according to Comparative Examples 1-1 and 1-2, the transition metal hydroxide precursors have molar ratios Mn/Me of 0.6 or more. It is determined that the batteries with the lithium-transition metal composite oxides for the positive active material each have a large "amount of charge between 4.35 and 4.6 V", but fail to achieve a high "discharge capacity during 4.35 V charge".

Furthermore, it is determined that the lithium-transition metal composite oxide according to Comparative Example 1-2 is insufficiently crystallized because of the low firing temperature of 650° C. for the transition metal hydroxide precursor and the lithium compound and FWHM (104) in excess of 0.6°.

In the lithium-transition metal composite oxide according to Comparative Example 1-3, the molar ratio Mn/Me satisfies the compositional range according to the present invention, but fails to satisfy the compositional range of the present invention in that the molar ratio Li/Me is 1.0 (not a lithium-excessive type). It is determined that the "discharge capacity during 4.35 V charge" is extremely low in spite of the same conditions for production as in Example 1-1.

The lithium-transition metal composite oxide according to Comparative Example 1-4 is an example of a $LiMeO_2$-type active material with Ni:Co:Mn of 1:1:1 and Li/Me of 1.0. Unlike lithium-excessive active materials, with the $LiMeO_2$-type active material even in initial charge with electricity up to a positive electrode potential of 5.0 V (vs. $Li/Li^+$), a region where the potential change is relatively flat with respect to the amount of charge is not observed within the electrode potential range of 4.5 (vs. $Li/Li^+$) or higher and 5.0 V (vs. $Li/Li^+$) or lower, with a small amount of charge between 4.35 and 4.6 V.

In the lithium-transition metal composite oxide according to Comparative Example 1-5, Li/Me is 1.1, but Mn/Me is 0.33, which is smaller than 0.4. With the active material containing the lithium-transition metal composite oxide according to Comparative Example 1-5 even in initial charge with electricity up to a positive electrode potential of 5.0 V (vs. $Li/Li^+$), a region where the potential change is relatively flat with respect to the amount of charge is not observed within the electrode potential range of 4.5 (vs. $Li/Li^+$) or higher and 5.0 V (vs. $Li/Li^+$) or lower, with a small "amount of charge between 4.35 and 4.6 V".

Accordingly, it is determined that the batteries according to Comparative Examples 1-4 and 1-5 are not capable of sufficiently expanding the SOC until the observation of a sudden increase in battery voltage in the case where a current is forced to be further applied beyond the full charge state (SOC 100%).

Next, the influence of the molar ratio Mn/Me on the "discharge capacity during 4.35 V charge" will be considered.

As mentioned above, Comparative Examples 1-1 and 1-2 with the molar ratio Mn/Me of 0.6 each have a low "discharge capacity during 4.35 V charge" of less than 120 mAh/g. In contrast, Examples 1 to 29 with the molar ratio Mn/Me of less than 0.6 are all excellent in that the "discharge capacity during 4.35 V charge" is 120 mAh/g or more. Above all, Examples 1-15 to 1-17 and 1-19 to 1-28 with the molar ratio Mn/Me of 0.50 or less are all further excellent in that the "discharge capacity during 4.35 V charge" is 140 mAh/g or more.

It is to be noted that according to the findings of the present inventor, the molar ratio Li/Me of 1.1 or more may achieve a high "discharge capacity during 4.35 V charge" depending on the composition, but the molar ratio Li/Me is preferably 1.15 or more in order to combine a large "amount of charge between 4.35 and 4.6 V." For example, in comparison between Examples 1-14 and Examples 1-29 under all the same conditions for the compositional proportions of Ni:Co:Mn, the reaction pH, and the firing temperature except for the difference in molar ratio Li/Me, it is determined that Example 1-29 with the molar ratio Li/Me of 1.2 has a greatly improved "amount of charge between 4.35 and 4.6 V" as compared with Example 1-14 with the molar ratio Li/Me of 1.1.

Furthermore, the molar ratio Ni/Me is preferably less than 0.6, because it is determined that Examples 1-18 and 1-19 with the molar ratio Ni/Me of less than 0.6 are larger in "the amount of charge between 4.35 and 4.6 V" than Examples 1-20 with the molar ratio Ni/Me of 0.6.

<Confirmation of Crystal Structure of Electrode after Charge-Discharge Test>

Among the nonaqueous electrolyte secondary batteries after the charge-discharge test, for Examples 1-1, 1-6, 1-14, and 1-22, the disassembly of the batteries and the X-ray diffraction measurement for the positive composites were performed in accordance with the procedures mentioned above.

The secondary batteries adapted to the initial charge-discharge condition 1 have a superlattice peak observed. In contrast, the secondary batteries adapted to the initial charge-discharge condition 2 have no superlattice peak observed.

Experimental Example 2

Experimental Example 2 has examples and comparative examples corresponding to the nonaqueous electrolyte secondary battery according to yet another embodiment of the present invention.

Example 2-1

<Preparation of Lithium-Transition Metal Composite Oxide>

A nickel sulfate hexahydrate, a cobalt sulfate heptahydrate, and a manganese sulfate pentahydrate were weighed respectively to 284 g, 303 g, and 443 g, and the total of these hydrates was dissolved in 4 L of ion-exchange water to prepare a 1.0 M aqueous solution of sulfates with a molar ratio Ni:Co:Mn of 27:27:46.

Next, 2 L of ion-exchange water was poured into a 5 L reaction tank, and bubbled with an Ar gas for 30 minutes to remove oxygen contained in the ion-exchange water. The temperature of the reaction tank was set to 50° C. (±2° C.), such that sufficient convection in the reaction tank was generated, while stirring the inside of the reaction layer at a rotation speed of 1500 rpm with the use of a paddle blade equipped with a stirring motor. The aqueous sulfate solution was delivered by drops to the reaction tank at a rate of 3 mL/min. In this regard, between the start of the dropping and the end thereof, a mixed alkaline solution composed of a 4.0 M sodium hydroxide, a 0.5 M ammonia, and a 0.2 M hydrazine was appropriately delivered by drops, thereby controlling the pH in the reaction tank to be always kept at 9.8 (±0.1), and the reaction liquid was partially discharged by overflow thereof, thereby controlling the total amount of the reaction liquid always not to exceed 2 L. After the completion of the dropping, stirring in the reaction tank was continued for another 3 hours. After stopping the stirring, the reaction tank was left at room temperature for 12 hours or longer.

Next, the hydroxide precursor particles produced in the reaction tank were separated with the use of a suction filtration device, sodium ions adhering to the particles were further washed away with the use of ion-exchange water, and with the use of an electric furnace, the particles were dried in an air atmosphere at 80° C. for 20 hours under ordinary pressure. Then, the powder was crushed for several minutes in an automatic agate mortar to make the particle sizes uniform. In this manner, a hydroxide precursor was prepared.

To 1.852 g of the hydroxide precursor, 0.971 g of a lithium hydroxide monohydrate was added, and mixed well with the use of an automatic agate mortar to prepare a mixed powder such that the molar ratio of Li:(Ni, Co, Mn) was 130:100. With the use of a pellet molding machine, the powder was subjected to molding at a pressure of 6 MPa to obtain pellets of 25 mm in diameter. The amount of the mixed powder subjected to the pellet molding was determined by converting the amount such that the assumed mass of the final product was 2 g. One of the pellets was placed on an alumina boat with a total length of about 100 mm, and the boat was placed in a box-type electric furnace (model number: AMF20), and subjected to a temperature increase from ordinary temperature to 900° C. over 10 hours, and then to firing at 900° C. for 5 hours, under ordinary pressure in an air atmosphere. The internal dimensions of the box-type electric furnace are 10 cm in length, 20 cm in width, and 30 cm in depth, with heating wires inserted at intervals of 20 cm in the width direction. After the firing, the heater was turned off, and the alumina boat was naturally cooled with the boat left in the furnace. As a result, the furnace temperature drops to about 200° C. after 5 hours, but the rate of the subsequent temperature decrease is rather slow. After all night and all day, the pellet was taken out after confirming that the temperature of the furnace was 100° C. or lower, and lightly broken in an agate mortar to make the particle sizes uniform.

In this manner, a lithium-transition metal composite oxide $Li_{1.23}Ni_{0.235}Co_{0.235}Mn_{0.40}O_2$ (hereinafter, referred to as "LR") was prepared.

<Confirmation of Crystal Structure>

The lithium-transition metal composite oxide mentioned above was subjected to X-ray diffraction measurement under the above-described conditions and in accordance with the above-described procedure, and was confirmed to have an $\alpha$-$NaFeO_2$-type crystal structure.

<Preparation of Positive Electrode>

With N-methylpyrrolidone as a dispersion medium, and the above-mentioned lithium-transition metal composite oxide as an active material, a paste for application was prepared in which the active material, acetylene black (AB), and polyvinylidene fluoride (PVdF) were mixed and dispersed in proportions of 90:5:5. The paste for application was applied on one surface of an aluminum foil current collector with a thickness of 20 μm to prepare a positive electrode according to Example 1. It is to be noted that the masses and applied thicknesses of the active materials applied per specific area were adjusted so as to achieve the same test condition for the nonaqueous electrolyte secondary batteries according to all of the examples and comparative examples described later.

<Preparation of Negative Electrode>

Metallic lithium foil was disposed on a nickel current collector to prepare a negative electrode. The amount of metallic lithium was adjusted such that the capacity of the battery was not limited by the negative electrode in combination with the positive electrode plate mentioned above.

<Assembly of Nonaqueous Electrolyte Secondary Battery>

A nonaqueous electrolyte secondary battery was assembled in accordance with the following procedure with the use of the positive electrode in the manner mentioned above.

As a nonaqueous electrolyte, a solution was used that was obtained by adding 0.5% by mass of lithium difluorophosphate (LiDFP) and 1% by mass of 4,4'-bis(2,2-dioxo-1,3,2-dioxathiolane) (compound A) to a mixed solvent of 4-fluoroethylene carbonate (FEC)/propylene carbonate (PC)/ethyl methyl carbonate (EMC) with a volume ratio of 1:1:8, and dissolving $LiPF_6$ therein to a concentration of 1 mol/L. As the separator, a polypropylene microporous membrane surface-modified with polyacrylate was used. A metal-resin composite film composed of polyethylene terephthalate (15 μm)/aluminum foil (50 μm)/metal-adhesive polypropylene film (50 μm) was used for the outer case. A nonaqueous electrolyte secondary battery was assembled by housing, in the outer case, the positive electrode according to Example 1 and the negative electrode with the separator interposed therebetween such that the open ends of the positive electrode terminal and negative electrode terminal were exposed to the outside, hermetically sealing the sealing body with inner surfaces of the metal-resin composite film being opposed to each other, except for a part for an injection hole, electrolyte solution filling, and then sealing the injection hole.

<Initial Charge-Discharge Step>

The assembled nonaqueous electrolyte secondary battery was subjected to an initial charge-discharge step at 25° C., with the upper limit voltage for normal use set to 4.25 V. The charge was constant current constant voltage (CCCV) charge with a current of 0.1 C and a voltage of 4.25 V, and the charge termination condition was the time when the current value was attenuated to ⅙. The discharge was constant current discharge with a current of 0.1 C and a cutoff voltage of 2.0 V. This charge-discharge was performed twice. In this regard, a pause process of 30 minutes was provided after each of charge and discharge, and the discharge capacity was checked.

Through the above-mentioned manufacturing steps, the nonaqueous electrolyte secondary battery according to Example 2-1 was finished.

Comparative Example 2-1

Similarly to Example 2-1 except for the use of commercially available $LiNi_{0.5}Co_{0.2}Mn_{0.3}O_2$ (hereinafter, referred to as "NCM523") as the positive active material, a nonaqueous electrolyte secondary battery was assembled and subjected to initial charge-discharge, thereby finishing a nonaqueous electrolyte secondary battery according to Comparative Example 2-1.

Comparative Example 2-2

With the use of the lithium-transition metal composite oxide prepared in Example 2-1 for the positive active material, a nonaqueous electrolyte secondary battery was assembled similarly to Example 2-1, and subjected to the same initial charge-discharge step as in Example 2-1 except that the first charge in the initial charge-discharge step was constant current constant voltage (CCCV) charge with a voltage of 4.6 V (vs. Li/Li⁺), thereby finishing a nonaqueous electrolyte secondary battery according to Comparative Example 2-2.

Example 2-2

In 200 mL of 0.1 M aluminum sulfate aqueous solution, 358 g of lithium-transition metal composite oxide $Li_{1.13}Ni_{0.235}Co_{0.235}Mn_{0.40}O_2$ prepared in Example 2-1 was input, and stirred at 25° C. and 400 rpm for 30 seconds with the use of a magnetic stirrer. Thereafter, the solution was separated by suction filtration into a powder and a filtrate. The obtained powder was dried in the atmosphere at 80° C. for 20 hours. Furthermore, the powder was subjected to a heat treatment in the atmosphere at 400° C. for 4 hours with the use of the box-type electric furnace described above. In this manner, a lithium-transition metal composite oxide coated with an aluminum compound (hereinafter referred to as "LR-Al") was prepared. Similarly to Example 2-1 except for the use of this lithium-transition metal composite oxide as the positive active material, a nonaqueous electrolyte secondary battery was assembled and subjected to initial charge-discharge, thereby finishing a nonaqueous electrolyte secondary battery according to Example 2-2.

<Confirmation of X-Ray Diffraction Peak of Positive Active Material>

With the use of the positive composites collected in accordance with the procedure and conditions described above from the nonaqueous electrolyte batteries according to Example 2-1 and Comparative Example 2-2, X-ray diffraction measurement was performed under the conditions described above. It has been confirmed that the positive active material according to Example 2-1 has a diffraction peak observed in the range of 20° or more and 22° or less in the X-ray diffraction pattern obtained with a CuKα line (see the lower part of FIG. 2), whereas the positive active material according to Comparative Example 2-2 has no diffraction peak observed in the range of 20° or more and 22° or less (see the upper part of FIG. 2).

<Overcharge Test>

With the use of the nonaqueous electrolyte secondary batteries according to the examples and comparative examples mentioned above, constant current (CC) charge was performed at a current value of 10 mA per 1 g of the positive composite without setting the upper limit of the voltage. In this regard, the ratio of the capacity Y (mAh) at each voltage to the capacity X (mAh) at the time of reaching 4.45 V from the start of the charge was denoted by Z (=Y/X*100(%)), and the capacity ratio Z (%) obtained when the positive electrode potential rose suddenly to cause the voltage to reach 5.1 V was recorded as a "retardation effect". In addition, the maximum value of dZ/dV was obtained.

Table 3 shows the delay effect (%) in the overcharge test of the nonaqueous electrolyte secondary batteries according to Examples 2-1 and 2-2 and Comparative Examples 2-1 and 2-2, and the maximum value of dZ/dV.

V (vs. Li/Li$^+$) or higher and 5.0 V (vs. Li/Li$^+$) or lower, in the case of the battery charged with electricity without setting the upper limit of the voltage.

Furthermore, the nonaqueous electrolyte secondary battery according to Comparative Example 2-2 includes the lithium-excessive active material for the positive electrode, but has an observed sudden increase in positive electrode potential at Z of 130% in the overcharge test, and thus also has an inadequate retardation effect. This is related to the fact that, because of the battery charged with electricity to cause the positive electrode potential to reach 4.6 V (vs. Li/Li$^+$) in the initial charge-discharge step, the positive electrode of the nonaqueous electrolyte secondary battery according to Comparative Example 2 has, in the overcharge test, no observed region with flat potential change with respect to the amount of charge within the positive electrode potential range of 4.5 V (vs. Li/Li$^+$) or higher and 5.0 V (vs. Li/Li$^+$) or lower, in the case of the battery charged with electricity without setting the upper limit of the voltage.

In contrast, the nonaqueous electrolyte secondary batteries according to Examples 2-1 and 2-2, each with a lithium-excessive active material used as an active material for the positive electrode, subjected to the initial charge-discharge step at a potential of lower than 4.5 V (vs. Li/Li$^+$), have excellent retardation effects as compared with Comparative Examples 2-1 and 2-2.

Next, nonaqueous electrolyte batteries were prepared by changing the compositions of the nonaqueous electrolytes with respect to Example 2-1 or 2-2.

Example 2-3

Similarly to Example 2-1 except that the lithium-transition metal composite oxide prepared in Example 1 was used as a positive active material and that the solvent of the nonaqueous electrolyte was changed to a mixed solvent composed of ethylene carbonate (EC)/propylene carbonate (PC)/ethyl methyl carbonate (EMC) with a volume ratio of 25:5:70, a nonaqueous electrolyte secondary battery was assembled and subjected to initial charge-discharge, thereby

TABLE 3

| | Active material | First charge voltage/V | Second charge voltage/V | Solvent | Volume ratio of solvent | Additive | Retardation effect/% | Maximum value of dZ/dV |
|---|---|---|---|---|---|---|---|---|
| Comparative Example 2-1 | NCM | 4.25 | ← | FEC/PC/EMC | 10/10/80 | Compound A + LiDFP | 135 | 83 |
| Comparative Example 2-2 | LR | 4.6 | 4.26 | FEC/PC/EMC | 10/10/80 | Compound A + LiDFP | 130 | 67 |
| Example 2-1 | LR | 4.25 | ← | FEC/PC/EMC | 10/10/80 | Compound A + LiDFP | 194 | 417 |
| Example 2-2 | LR-Al | 4.25 | ← | FEC/PC/EMC | 10/10/80 | Compound A + LiDFP | 176 | 566 |

According to Table 3, the nonaqueous electrolyte secondary battery according to Comparative Example 2-1 with NCM523 used as an active material for the positive electrode has an inadequate retardation effect, because the positive electrode potential rose suddenly at Z of 135% to cause the voltage to reach 5.1 V in the overcharge test. This is related to the fact that, in the overcharge test, the positive electrode of the nonaqueous electrolyte secondary battery according to Comparative Example 2-1 has no observed region with flat potential change with respect to the amount of charge within the positive electrode potential range of 4.5 finishing a nonaqueous electrolyte secondary battery according to Comparative Example 2-3.

Example 2-4

Similarly to Example 1 except that the solvent of the nonaqueous electrolyte was changed similarly to Example 2-3, with vinylene carbonate (VC) further added as an additive at 0.2% by mass, a nonaqueous electrolyte secondary battery was assembled and subjected to initial charge-discharge, thereby finishing a nonaqueous electrolyte secondary battery according to Comparative Example 2-4.

Example 2-5

A nonaqueous electrolyte secondary battery according to Example 2-5 was finished similarly to Example 2-1 except that the solvent of the nonaqueous electrolyte was changed to a mixed solvent with a volume ratio FEC/EMC of 20:80.

Example 2-6

A nonaqueous electrolyte secondary battery according to Example 2-6 was finished similarly to Example 2-1 except that the solvent of the nonaqueous electrolyte was changed to a mixed solvent with a volume ratio FEC/EMC of 5:95.

Examples 2-7 and 2-8

Similarly to Example 2-1 except that the lithium-transition metal composite oxide coated with the aluminum compound, prepared in Example 2-2 was used as a positive active material, and that the solvent of the nonaqueous electrolyte was changed respectively to the same solvents as in Examples 3 and 4, nonaqueous electrolyte secondary batteries were assembled and subjected to initial charge-discharge, thereby finishing nonaqueous electrolyte secondary batteries according to Examples 2-7 and 2-8.

<Storage Test>

The nonaqueous electrolyte secondary batteries according to Examples 2-1 to 2-8 were subjected to the internal resistance measurement after storage under the above-described conditions. The results are shown in Table 4.

secondary batteries with the nonaqueous electrolytes containing no FEC according to Examples 2-7 and 2-8.

INDUSTRIAL APPLICABILITY

The use of the positive active material including the lithium-transition metal composite oxide according to the present invention makes it possible to provide a nonaqueous electrolyte secondary battery with safety further improved, in which the discharge capacity is high even in the case of charge with electricity at a relatively low voltage, Accordingly, this nonaqueous electrolyte secondary battery is useful as a nonaqueous electrolyte secondary battery for hybrid vehicles, electric vehicles, plug-in hybrid vehicles, and the like.

DESCRIPTION OF REFERENCE SIGNS 1A, 1B: Measurement probe
2A, 2B Measurement surface
3A, 3B: Base
6: Side body
7: Through hole
1: Nonaqueous electrolyte secondary battery
2: Electrode group
3: Battery case
4: Positive electrode terminal
4': Positive electrode lead
5: Negative electrode terminal
5': Negative electrode lead
20: Energy storage unit
30: Energy storage apparatus

TABLE 4

| | Active material | First charge voltage/V | Second charge voltage/V | Solvent | Volume ratio of solvent | Additive | Resistance increase rate on 15th day with respect to initial value/% |
|---|---|---|---|---|---|---|---|
| Example 2-1 | LR | 4.25 | ← | FEC/PC/EMC | 10/10/80 | Compound A + LiDFP | 14 |
| Example 2-3 | LR | 4.25 | ← | EC/PC/EMC | 25/5/70 | Compound A + LiDFP | 18 |
| Example 2-4 | LR | 4.25 | ← | EC/PC/EMC | 25/5/70 | Compound A + LiDFP + VC | 20 |
| Example 2-5 | LR | 4.25 | ← | FEC/EMC | 20/80 | Compound A + LiDFP | 10 |
| Example 2-6 | LR | 4.25 | ← | FEC/EMC | 5/95 | Compound A + LiDFP | 11 |
| Example 2-2 | LR-Al | 4.25 | ← | FEC/PC/EMC | 10/10/80 | Compound A + LiDFP | 17 |
| Example 2-7 | LR-Al | 4.25 | ← | EC/PC/EMC | 25/5/70 | Compound A + LiDFP | 30 |
| Example 2-8 | LR-Al | 4.25 | ← | EC/PC/EMC | 25/5/70 | Compound A + LiDFP + VC | 29 |

According to Table 4, it is determined that among Examples 2-1 and 2-3 to 2-6 with LR as the positive active materials, the increase in internal resistivity after the storage is more suppressed in the nonaqueous electrolyte secondary batteries with the nonaqueous electrolytes containing FEC according to Examples 2-1, 2-5, and 2-6 than the nonaqueous electrolyte secondary batteries with the nonaqueous electrolytes containing no FEC according to Examples 2-3 and 2-4. In addition, it is determined that among Examples 2-2, 2-7, and 2-8 with LR-Al as the positive active materials, the increase in internal resistivity after the storage is also more suppressed in the nonaqueous electrolyte secondary battery with the nonaqueous electrolyte containing FEC according to Example 2-2 than the nonaqueous electrolyte

The invention claimed is:

1. A nonaqueous electrolyte charged secondary battery comprising a positive electrode, a negative electrode, and a nonaqueous electrolyte,
wherein the nonaqueous electrolyte secondary battery has undergone an initial charge-discharge,
a maximum attainable potential of the positive electrode in the initial charge-discharge is less than 4.5 V (vs. Li/Li$^+$),
the positive electrode contains a positive active material which contains a lithium-transition metal composite oxide, the lithium-transition metal composite oxide
has an α-NaFeO$_2$ structure,
with a molar ratio Li/Me of Li to the transition metal (Me) being 1.05≤Li/Me<1.4, and
contains Ni and Mn, or contains Ni, Co, and Mn as the transition metal (Me), with a molar ratio Mn/Me of Mn to Me being 0.4≤Mn/Me<0.6, and a molar ratio Ni/Me of Ni to Me being 0.2≤Ni/Me≤0.6, and
in a case where the nonaqueous electrolyte secondary battery is charged with electricity up to a positive electrode potential of 5.0 V (vs. Li/Li$^+$), a region where a potential change is relatively flat with respect to an amount of charge is observed within a positive electrode potential range of 4.5 V (vs. Li/Li$^+$) or higher and 5.0 V (vs. Li/Li$^+$) or lower.

2. A method for manufacturing the nonaqueous electrolyte secondary battery according to claim 1, the method comprising: assembling the positive electrode, the negative electrode and the nonaqueous electrolyte; and subjecting the battery to the initial charge-discharge, wherein the positive electrode in the initial charge-discharge step has a maximum attainable potential of higher than 4.3 V (vs. Li/Li$^+$) and lower than 4.5 V (vs. Li/Li$^+$).

3. A method for using the nonaqueous electrolyte secondary battery according to claim 1, for use at a battery voltage at which the positive electrode has a maximum attainable potential of higher than 4.3 V (vs. Li/Li$^+$) and lower than 4.5 V (vs. Li/Li$^+$) in a full charge state (SOC 100%).

4. A nonaqueous electrolyte charged secondary battery comprising a positive electrode, a negative electrode, and a nonaqueous electrolyte,
wherein the nonaqueous electrolyte secondary battery has undergone an initial charge-discharge,
a maximum attainable potential of the positive electrode in the initial charge-discharge is less than 4.5 V (vs. Li/Li$^+$),
the positive electrode contains a positive active material which contains a lithium-transition metal composite oxide,
the lithium-transition metal composite oxide
has an α-NaFeO$_2$ structure,
with a molar ratio Li/Me of Li to the transition metal (Me) being 1.05≤Li/Me<1.4, and
contains Ni and Mn, or contains Ni, Co, and Mn as the transition metal (Me), with a molar ratio Mn/Me of Mn to Me being 0.4≤Mn/Me<0.6, and a molar ratio Ni/Me of Ni to Me being 0.2≤Ni/Me≤0.6, and
the positive active material of the nonaqueous electrolyte secondary battery which has undergone the initial charge-discharge has a diffraction peak observed in a range of 20° or more and 22° or less in an X-ray diffraction pattern obtained with a CuKα line.

5. A nonaqueous electrolyte charged secondary battery comprising a positive electrode, a negative electrode, and a nonaqueous electrolyte,
wherein the nonaqueous electrolyte secondary battery has undergone an initial charge-discharge,
a maximum attainable potential of the positive electrode in the initial charge-discharge is less than 4.5 V (vs. Li/Li$^+$),
the positive electrode contains a positive active material which contains a lithium-transition metal composite oxide,
the lithium-transition metal composite oxide
has an α-NaFeO$_2$ structure,
with a molar ratio Li/Me of Li to the transition metal (Me) being 1.05≤Li/Me<1.4, and
contains Ni and Mn, or contains Ni, Co, and Mn as the transition metal (Me), with a molar ratio Mn/Me of Mn to Me being 0.4≤Mn/Me<0.6, and a molar ratio Ni/Me of Ni to Me being 0.2≤Ni/Me≤0.6, and
in a case where the nonaqueous electrolyte secondary battery is charged with electricity up to a positive electrode potential of 4.6 V (vs. Li/Li$^+$), a dZ/dV value of a dZ/dV curve has a maximum value of 150 or more in a potential range of 4.35 V (vs. Li/Li$^+$) or higher and 4.6 V (vs. Li/Li$^+$) or lower, where Z is a capacity ratio (%) at each potential, based on a capacity at reaching 4.35 V (vs. Li/Li$^+$) from charge start, and V is a positive electrode potential.

* * * * *